United States Patent
Lee

(10) Patent No.: US 7,821,256 B2
(45) Date of Patent: *Oct. 26, 2010

(54) LINEAR AND ROTATIONAL INDUCTIVE POSITION SENSOR

(75) Inventor: Joong K. Lee, Chatham (CA)

(73) Assignee: KSR Technologies Co., Ridgetown (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/241,508

(22) Filed: Sep. 30, 2008

(65) Prior Publication Data

US 2009/0021245 A1    Jan. 22, 2009

Related U.S. Application Data

(62) Division of application No. 11/474,685, filed on Jun. 26, 2006, now Pat. No. 7,449,878.

(60) Provisional application No. 60/694,384, filed on Jun. 27, 2005.

(51) Int. Cl.
*H01F 5/00* (2006.01)
*G01B 7/30* (2006.01)

(52) U.S. Cl. ............... 324/207.17; 324/207.25

(58) Field of Classification Search ............ 324/207.15, 324/207.16, 207.17, 207.18, 207.19, 207.22, 324/207.23, 207.24, 207.25
See application file for complete search history.

(56) References Cited

U.S. PATENT DOCUMENTS

| | | | |
|---|---|---|---|
| 3,662,257 A | 5/1972 | Fujiwara et al. |
| 3,777,255 A | 12/1973 | Young at al. |
| 3,777,273 A | 12/1973 | Baba et al. |
| 3,852,661 A | 12/1974 | Szabo et al. |
| 4,005,396 A | 1/1977 | Fujiwara et al. |
| 4,013,911 A | 3/1977 | Fujiwara et al. |
| 4,071,818 A | 1/1978 | Krisst |
| 4,080,592 A | 3/1978 | Zabler et al. |
| 4,156,192 A | 5/1979 | Schedrovitsky et al. |

(Continued)

FOREIGN PATENT DOCUMENTS

DE    1502697    3/1978

(Continued)

OTHER PUBLICATIONS

J. Szczyrbank, E. Schmidt, "LVDT Signal Conditioning Techniques," Apr. 1997.

(Continued)

*Primary Examiner*—Kenneth J Whittington
(74) *Attorney, Agent, or Firm*—Gifford, Krass, Sprinkle, Anderson & Citkowski, P.C.

(57) ABSTRACT

An apparatus for providing a signal related to a position of a part comprises an exciter coil, and a receiver coil disposed proximate to the exciter coil. The exciter coil generates magnetic flux when the exciter coil is energized by a source of electrical energy, such as an alternating current source. The receiver coil generates a receiver signal when the exciter coil is energized, due to an inductive coupling between the receiver coil and the exciter coil. The receiver coil has a plurality of sections, the inductive coupling tending to induce opposed voltages in at least two of the sections. Embodiments of the present invention include linear sensors, rotational sensors, and novel configurations for improved ratiometric sensing.

19 Claims, 18 Drawing Sheets

U.S. PATENT DOCUMENTS

| | | | |
|---|---|---|---|
| 4,170,754 A | 10/1979 | Schmitz et al. |
| 4,189,674 A | 2/1980 | Lathlaen |
| 4,210,865 A | 7/1980 | Nikolaev et al. |
| 4,223,300 A | 9/1980 | Wiklund et al. |
| 4,401,986 A | 8/1983 | Trenkler et al. |
| 4,560,930 A | 12/1985 | Kouno et al. |
| 4,584,577 A | 4/1986 | Temple et al. |
| 4,638,250 A | 1/1987 | Shen-Orr et al. |
| 4,648,473 A | 3/1987 | Bergner |
| 4,649,473 A | 3/1987 | Hammer et al. |
| 4,737,698 A | 4/1988 | McMullin et al. |
| 4,958,607 A | 9/1990 | Lundberg |
| 5,003,260 A | 3/1991 | Auchterlonie |
| 5,036,275 A | 7/1991 | Munch et al. |
| 5,117,319 A | 5/1992 | Tokunaga et al. |
| 5,233,294 A | 8/1993 | Dreoni |
| 5,233,882 A | 8/1993 | Byram et al. |
| 5,291,782 A | 3/1994 | Taylor |
| 5,563,922 A | 10/1996 | Beltz et al. |
| 5,592,082 A | 1/1997 | Kuriyama et al. |
| 5,972,420 A | 10/1999 | Saito et al. |
| 6,011,389 A | 1/2000 | Masreliez et al. |
| 6,018,318 A | 1/2000 | Schodlbauer et al. |
| 6,112,402 A | 9/2000 | Saito et al. |
| 6,153,062 A | 11/2000 | Saito et al. |
| 6,166,535 A | 12/2000 | Irle et al. |
| 6,201,465 B1 | 3/2001 | Saito et al. |
| 6,236,199 B1 | 5/2001 | Irle et al. |
| 6,255,810 B1 | 7/2001 | Irle et al. |
| 6,304,076 B1 | 10/2001 | Madni et al. |
| 6,329,813 B1 | 12/2001 | Andermo |
| 6,341,426 B1 | 1/2002 | Okumura et al. |
| 6,366,078 B1 | 4/2002 | Irle et al. |
| 6,369,564 B1 | 4/2002 | Khalfin et al. |
| 6,384,597 B1 | 5/2002 | Irle et al. |
| 6,384,598 B1 | 5/2002 | Hobein et al. |
| 6,400,139 B1 | 6/2002 | Khalfin et al. |
| 6,404,186 B1 | 6/2002 | Schodlbauer et al. |
| 6,412,364 B1 | 7/2002 | Berglar et al. |
| 6,443,020 B1 | 9/2002 | Lin et al. |
| 6,448,759 B2 | 9/2002 | Madni et al. |
| 6,466,889 B1 | 10/2002 | Schodlbauer |
| 6,467,338 B1 | 10/2002 | Irle et al. |
| 6,483,295 B2 | 11/2002 | Irle et al. |
| 6,496,338 B2 | 12/2002 | Hasegawa et al. |
| 6,518,749 B1 | 2/2003 | Oudet et al. |
| 6,520,031 B2 | 2/2003 | Madni et al. |
| 6,522,128 B1 | 2/2003 | Ely et al. |
| 6,531,866 B2 | 3/2003 | Miyata et al. |
| 6,534,970 B1 | 3/2003 | Ely et al. |
| 6,541,960 B2 | 4/2003 | Nekado et al. |
| 6,549,004 B1 | 4/2003 | Prigge |
| 6,552,533 B2 | 4/2003 | Schodlbauer et al. |
| 6,584,428 B1 | 6/2003 | Irle et al. |
| 6,593,730 B2 | 7/2003 | Zapf et al. |
| 6,593,734 B1 | 7/2003 | Gandel et al. |
| 6,611,790 B1 | 8/2003 | Reichl et al. |
| 6,615,155 B2 | 9/2003 | Gilboa et al. |
| 6,622,589 B1 | 9/2003 | Pino et al. |
| 6,642,711 B2 | 11/2003 | Kawate et al. |
| 7,191,759 B2 | 3/2007 | Lee et al. |
| 2001/0005133 A1 | 6/2001 | Madni et al. |
| 2002/0040531 A1 | 4/2002 | Schodlbauer |
| 2002/0089326 A1* | 7/2002 | Morrison et al. ....... 324/207.12 |
| 2002/0171417 A1 | 11/2002 | Schodlbauer |
| 2003/0137294 A1 | 7/2003 | Gleixner et al. |
| 2003/0151402 A1 | 8/2003 | Kindler |
| 2003/0206007 A1* | 11/2003 | Gass et al. ............. 324/207.17 |
| 2004/0041558 A1* | 3/2004 | Hasegawa et al. ...... 324/207.25 |
| 2004/0216550 A1 | 11/2004 | Fallak et al. |
| 2005/0030010 A1 | 2/2005 | Jones et al. |
| 2005/0223841 A1 | 10/2005 | Lee |
| 2005/0225320 A1 | 10/2005 | Lee |
| 2006/0233123 A1 | 10/2006 | Lee |
| 2006/0255794 A1 | 11/2006 | Lee |
| 2007/0194781 A1* | 8/2007 | Zhitomirskiy .......... 324/207.17 |
| 2007/0194782 A1 | 8/2007 | Lee |

FOREIGN PATENT DOCUMENTS

| | | |
|---|---|---|
| EP | 0986731 | 3/2000 |
| GB | 2352522 | 1/2001 |
| WO | WO-98/55828 | 12/1998 |
| WO | WO-00/52425 | 9/2000 |

OTHER PUBLICATIONS

"LVDT Signal Conditioner," Analog Devices, (Author unknown).

* cited by examiner

LINEAR AND ROTATIONAL INDUCTIVE POSITION SENSOR

REFERENCE TO RELATED APPLICATION

This application is a divisional of U.S. patent application Ser. No. 11/474,685, filed Jun. 26, 2008, which claims priority to U.S. Provisional Application U.S. Ser. No. 60/694,384, filed Jun. 27, 2005, the entire content of each of which are incorporated herein by reference.

FIELD OF THE INVENTION

The invention relates to inductive position sensors, in particular to linear sensors, and also to rotational position sensors

BACKGROUND OF THE INVENTION

Inductive rotational sensors are described in our co-pending patent application Ser. Nos. 11/399,150, 11/102,046, and 11/400,154, the contents of all of which are incorporated herein by reference.

However, rotational sensors inherently restrict the distance of travel that can be measured in certain applications, for example, electronic throttle controls for automobiles. The use of linear sensors, or sensors sensitive to motion including a linear component, may provide more sensitive measurements over a longer travel range.

Signals from the receiver coils of inductive sensors are prone to variation due to noise and manufacturing variations, for example variations in part separations. Improved sensors giving positional signals corrected for such common mode factors would be of great commercial interest, particularly for electronic throttle control applications, amongst many other possible applications.

SUMMARY OF THE INVENTION

An apparatus for providing a signal related to a position of a movable part (movable referring to linear motion, rotation, or any combination of motion types) comprises an exciter coil, and a receiver coil disposed proximate to the exciter coil. The exciter coil generates magnetic flux when the exciter coil is energized by a source of electrical energy, such as an alternating current source. The receiver coil generates a receiver signal when the exciter coil is energized, due to an inductive coupling between the receiver coil and the exciter coil. The receiver coil has a plurality of sections, the inductive coupling tending to induce opposed voltages in at least two of the sections. A coil assembly includes the exciter coil, one or more receiver coils, and an optional reference coil. The coil assembly may be formed on a substrate, for example as metal tracks on a printed circuit board which can also be used to support an electronic circuit for signal processing.

The inductive coupling is modified by movement of the part so that the receiver signal is related to the position of the part. For example, a coupler element may be mechanically coupled to the part, so that the coupler element modifies the inductive coupling between the exciter coil and the receiver coil as it moves, so that the receiver signal is related to the coupler position and hence the part position. The coupler element may comprise a metal plate, generally U-shaped metal structure, or other structure that modifies the inductive coupling.

In some embodiments of the present invention, the receiver coil is generally elongated, having a first end and a second end, a first section of the receiver coil having a major area proximate to first end, and a second section of the receiver coil having a major area closer to the second end than the first section. The first section and the second section being having opposite winding directions, the inductive coupling between the exciter coil and the section inducing a first voltage, the inductive coupling between the exciter coil and the second section inducing a second voltage, the first and second signals being of opposite phase, the receiver signal being a combination including the first voltage and the second voltage.

The exciter coil may have a generally elongated perimeter, such as a substantially rectangular perimeter, and is generally planar for a linear sensor. The receiver coil(s) may lie in a plane parallel to that of the exciter coil, and may be substantially coplanar with the exciter coil, or with an offset such as the width of a supporting printed circuit board or other substrate. The exciter coil may have a generally cylindrical geometry for novel rotational sensors described herein.

In some examples of the present invention, the receiver coil includes at least two sections. The sections may be triangular, diamond shaped, or other shape according to the nature of the position-sensitive signal required. Movement of the coupler element changes the relative degree of inductive coupling between the exciter coil and the two or more sections. A linear position sensor provides a signal related to the position of a part along a linear path. A rotational sensor may be configured so that the coil assembly (exciter, receiver, and optional reference coils) are disposed on a generally cylindrical surface, and the apparatus may be a rotational sensor for a shaft extending through the generally cylindrical surface. A reference signal, which can be used for correcting the receiver signals for common mode factors, may be obtained from a separate reference coil. In other examples, a plurality of receiver coils are used, and the reference signal is obtained from a combination of signals obtained from the reference coils.

A reference coil may be configured to provide a signal substantially independent of the position of the part when the exciter coil is energized, and used in ratiometric signal processing (such as an analog division) to correct the position-dependent signals for common mode factors. The reference signal may also be used to estimate the gap or offset between the coil assembly and a coupler element, for example to determine a number of turns made. A reference coil, if used, may have a first section located inside the exciter coil, and a one or more other sections located outside the exciter coil.

An electronic circuit may be provided operable to generate a positional signal that has a substantially linear relationship with the position to be measured, either as a voltage versus linear position, voltage versus angular position, position along a curved path, or other position that is a combination of linear motion and rotation. The part position may be a position of a pedal, movement of the pedal being mechanically coupled to the position of the coupler element, for example for electronic throttle applications. The apparatus may comprise an electronic circuit operable to providing a speed control to an engine.

Hence, an apparatus according to an embodiment of the present invention for determining a part position of a part, comprises: an exciter coil, the exciter coil generating magnetic flux when the exciter coil is energized by a source of electrical energy; a plurality of receiver coils disposed proximate to the exciter coil, the receiver coils generating a plurality of receiver signals when the exciter coil is energized due to an inductive coupling between the receiver coils and the exciter coil; a moveable coupler element having a position correlated with the part position, the coupler element modifying the inductive coupling between the exciter coil and the receiver coils so that each receiver signal is correlated with the part position; and an electronic circuit providing a ratiometric signal derived from at least one of the receiver signals and the reference signal. The electronic circuit may generate the reference signal using at least two of the receiver coils, so that the reference signal is substantially independent of the coupler element position. Alternatively, a separate reference coil may be used.

The reference signal, however obtained, may be used to compensate for variations in the receiver signal that is not correlated with the coupler position, such as noise, supply voltage variations, and manufacturing variations. The reference signal may be obtained using non-phase-sensitive rectification of at least two receiver signals, or from a separate reference coil.

BRIEF DESCRIPTION OF THE DRAWINGS

FIGS. 5A-5C show an alternative configuration for a linear sensor;

DETAILED DESCRIPTION OF THE INVENTION

Figure 1A:
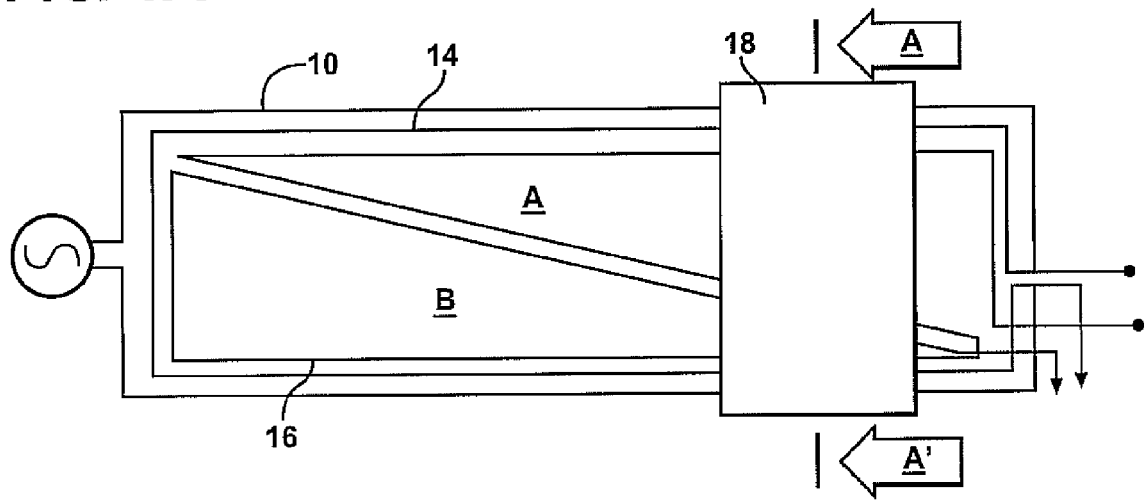
FIGS. 1A-1C show a linear inductive sensor in plan view and cross-section, respectively.

This invention relates to an inductive sensor for providing electrical signals related to the position of a mechanical part, for example a part moveable along a linear path. Embodiments of the invention include a high resolution linear sensor for use with an electronic throttle control.

The part whose position is to be sensed, such as a pedal component, is mechanically coupled to a coupler element. The coupler element may be an electrically conductive component, such as a metal plate, attached to the part. For example, the coupler element may be a conductive plate, a generally U-shaped conductor, a coil wound in a plane, or other component capable of modifying the inductive coupling between coils. The coupler element may be an eddy plate that blocks the magnetic flux coupling between the exciter coil and the receiver coil(s), usually made of a conducting material such as copper plate.

As the part moves, the coupler element moves with respect to at least two coils. An exciter coil (which may also be called a transmitter coil) is connected to a sinusoidal alternating current source (excitation source, such as a Colpitts oscillator) and generates magnetic flux. There is also a receiver coil, which in a linear sensor may be referred to as a linear modulator (LM). In a rotational sensor, the receiver coil may be referred to as a rotational modulator (RM). The receiver coil may also be referred to as a sensor coil. In examples below, the term LM (linear modulator) is sometimes used for the receiver coils in a rotation sensor, for example for coil assemblies having a generally cylindrical form.

The receiver coil is preferably formed in the same plane as the exciter coil. In response to the movement of the part to be sensed, the coupler element is moved in a plane parallel to the two coils, and is closely spaced with respect to the coils, so as to affects the degree of inductive coupling between the exciter coil and the receiver coil, and thus the electrical current induced in the receiver coil by the AC field of the exciter coil.

In some embodiments of the invention, the receiver coil is wound as a pair of coil sections connected in series. One coil section has a major area at one end of the coupling element motion and decreases in area to a minimum area at the other end of the coupler element motion. The second coil section has a minimum area at the end of the motion at which the first coil section has a major area, and vice versa. The coil sections are wound so that the induced voltages in each section are opposed. For example, the sections of the receiver coil may be wound in opposed directions or handedness. A signal is generated from the series combination of the two receiver coil sections. When the coupler element is positioned near one end of its travel, inductive coupling is greater with one section, and when the coupler element moves towards the other end of its travel, inductive coupling to the first section diminishes while coupling to the second section increases. Thus, the receiver signal is correlated with the position of the coupler element. Using phase sensitive rectification, a position signal may be obtained that is substantially linear with position.

Any variation in the gap between the plane of the coupler element and the plane on which the exciter and receiving coils are wound leads to a variation in the receiver signal. Other variations in receiver signal result may be due to variations in the exciter supply voltage, temperature variations, extraneous electromagnetic signals (electrical noise), and the like, generally termed common mode signals. A third section, termed a distance modulator (DM), is formed on the device. This coil may also be referred to as a reference coil. The distance modulator may be a coil wound in such a way that its output signal is substantially unaffected by the position of the coupler element, yet its output signal will be affected by gap variation and the other common mode signals.

The function of the distance modulator (DM) may also be provided by a combination of receiver coils, or sections of a receiver coil.

An electronic circuit can be used to obtain a position signal that is proportional to the part position. For example, using phase sensitive rectification of signals obtained from the receiver coil and the distance modulator, followed by analog division, the common mode effects can be eliminated. Alternatively, by subtracting the output of the distance modulator coil from the output of the receiving coil, the receiving coil signal is normalized by removing the common mode signals.

In one embodiment of the invention, the exciter coil and the receiving coil are formed on a printed circuit board and the coupler element moves proximate to the circuit board. The distance modulator may be formed so as to tale advantage of the nature of the electromagnetic flux pattern generated by the exciter coil. By forming the exciter coil so that the opposed sides of it extend along opposed longitudinal elements of the circuit board, which is elongated in the direction of motion of the coupler element, the fields which these coil sections generate will extend beyond the area of the exciter.

The distance modulator can be essentially formed as two (or more) serial sections, one disposed within the area defined by the exciter coil and at least one disposed externally of that area. This configuration allows larger gain from the distance modulator coil, and accordingly a larger length of linear travel of the coupler element. Since the flux density through the inside region of the exciter coil will be greater than the flux density outside of that area, the section of the distance modulator which extends outside of the bounds of the exciter coil may require a larger number of turns than the section within the exciter, to provide equal amplitudes from the two.

In an alternative embodiment of the invention the distance modulator has three sections, one inside section encompassed within the bounds of the exciter coil and two outside sections outside of the bounds of the exciter coil. This design tends to balance out the capacitive coupling between the exciter coil and the sections of the distance modulator which are outside of the exciting coil.

An electronic circuit for providing a position signal from the various coil signals can be disposed on the circuit board within the bounds of an outside section of the distance modulator coil, outside the confines of the exciter coil.

Hence, an inductive linear position sensor for determining a part position, the part having a coupler element attached thereto, comprises: an exciter coil; an alternating current excitation source for energizing the exciter coil; a receiver coil configured so that the signal induced in the receiver coil by the exciter coil field is a function of the position of the coupler element; and (optionally) a distance modulator coil configured so that the signal is substantially independent of the coupler element position but related to the gap between the coupler element and the coil. The exciter coil(s), receiver coil(s), and optional distance modulator coil(s) may collectively be referred to as a coil assembly, and may be formed on a printed circuit board.

An electronic circuit receives the various signals from the coil assembly and provides a position signal related to the coupler element position. The receiver coil may be formed within the limits of the exciting coil. The distance modulator may be formed partially within the limits of the exciter coil and partially exterior of the limits of the exciter coil, and configured so that flux induced in the distance modulator by the exciter coil is substantially independent of the position of the coupler element, whereby the distance modulator output may be used to correct the receiver output to eliminate various common mode signals and the effect of gap variation.

FIG. 1A shows a coil assembly according to an embodiment of the present invention, configured for linear inductive sensing. The coil assembly includes exciter coil 10, excitation source 12, a distance modulator (DM coil) 14, a receiver coil, in this case a linear modulator (LM) coil 16, and coupler element 18. The exciter coil 10 is energized by the excitation source and there is inductive coupling between the exciter coil and both the distance modulator 14 and linear modulator 16, which induces signals in both these coils. The signal from the distance modulator is correlated with the gap between the DM and the coupler element, and is substantially independent of the position of the coupler element.

Figure 1B:
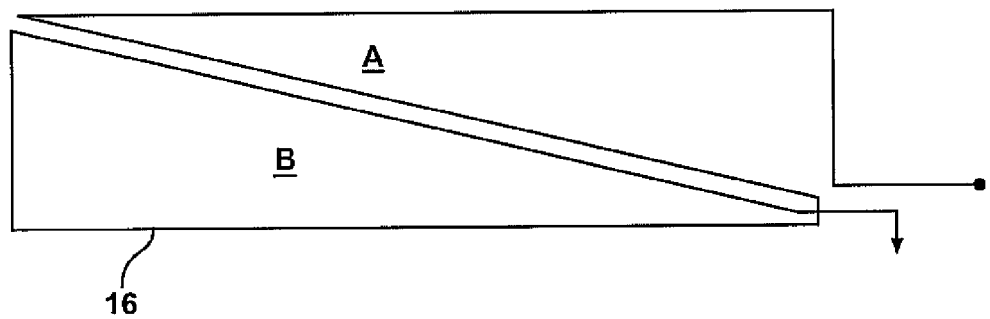

FIG. 1B shows the LM in isolation. The linear modulator includes two sections, which are indicated A and B in the figure, which are approximate a pair of triangular windings having opposed winding directions. The LM produces an output signal that is related to the position of the coupler element. Hence, the voltages induced in each section tend to oppose, as in this case the LM is inside the exciter coil. The LM, or any receiver coil in any other example, is not necessarily entirely inside the exciter, but can be approximately (or substantially) inside. As the coupler element moves from its indicated position at 18 to a position further to the left, the signal from the LM changes as the contribution from the two sections A and B of the linear modulator vary in proportion, due to different degrees of blocking of the inductive coupling by the coupler element.

The linear modulator has a differential structure, so called because in the absence of the coupler element, the contributions from the two substantially triangular sections would tend to cancel out. Hence, the inductive coupling between the exciter coil and the linear modulator varies with the position of the coupler element 18. As the sections have opposite winding directions, and both are within the exciter coil, the voltages induced in each sections are opposed. This may be described by referring to one section as forward and the other section as backward. One section (forward) tends to produce a signal in phase with the exciter, the other section (backward) produces a signal out of phase. Hence, phase sensitive rectification of the overall output signal of the LM allows the position of the coupler to be determined.

With the coupler element in the position shown, inductive coupling between the exciter coil and section A of the LM is blocked to a greater degree than the inductive coupling between the exciter coil and the section B of the LM. As the coupler element moves to the left, the relative inductive coupling between the exciter coil and the two sections denoted A and B changes in proportion. If the coupler element is in a left-most position while still remaining in the confines of the exciter coil, the inductive coupling with section B will be more greatly diminished. In the latter case, the output voltage from the LM will be dominated from the signal generated within section A.

The solid lines in these figures represent conductive elements, such as wires, ribbons, or other elongate electronic conductors. In preferred examples, the lines represent tracks on a printed circuit board, which may be double-sided, multi-layered, or otherwise configured as appropriate to the application. The same circuit board may also support an electronic circuit receiving signals from the coil, and possibly including an oscillator for the excitation source. The crossing of two lines generally does not represent electrical interconnection. The coils may be formed on a substrate, such as a PCB, but in most examples the substrate is not shown.

Figure 1C:
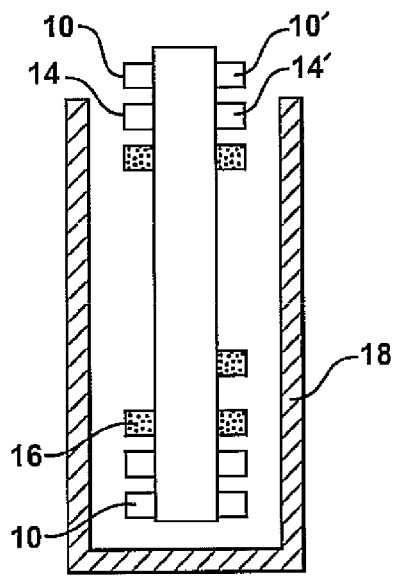

FIG. 1C shows a section A-A' of FIG. 1A in cross-section. This shows a printed circuit board 19 supporting the exciter coil 10, DM 14, and LM 16. The coupler element 18 is shown as being a substantially U-shaped in cross-section, however other forms of coupler elements, such as a plate, may also be used. FIG. 1B illustrates the use of two exciter coils (10 and 10') and DM coils (14 and 14'); this increases also the reliability of the linear sensor by providing redundancy, but may not be required depending on the application. The two exciter coils are both labeled 10 and are shown on opposed surfaces of the circuit board 19.

The coupler element may be formed from a folded copper plate, or may alternatively comprise any electrically conducting material. The U-shaped structure of the coupler element helps compensate for gap variations, in particular tilt (as illustrated) so in this example that the distance modulator is a simple loop, and does not have a differential structure. The coupler element compensates both gap and tilt in this configuration. The coil assembly is located at least in part within the generally U-shaped coupler element.

Figure 2A:
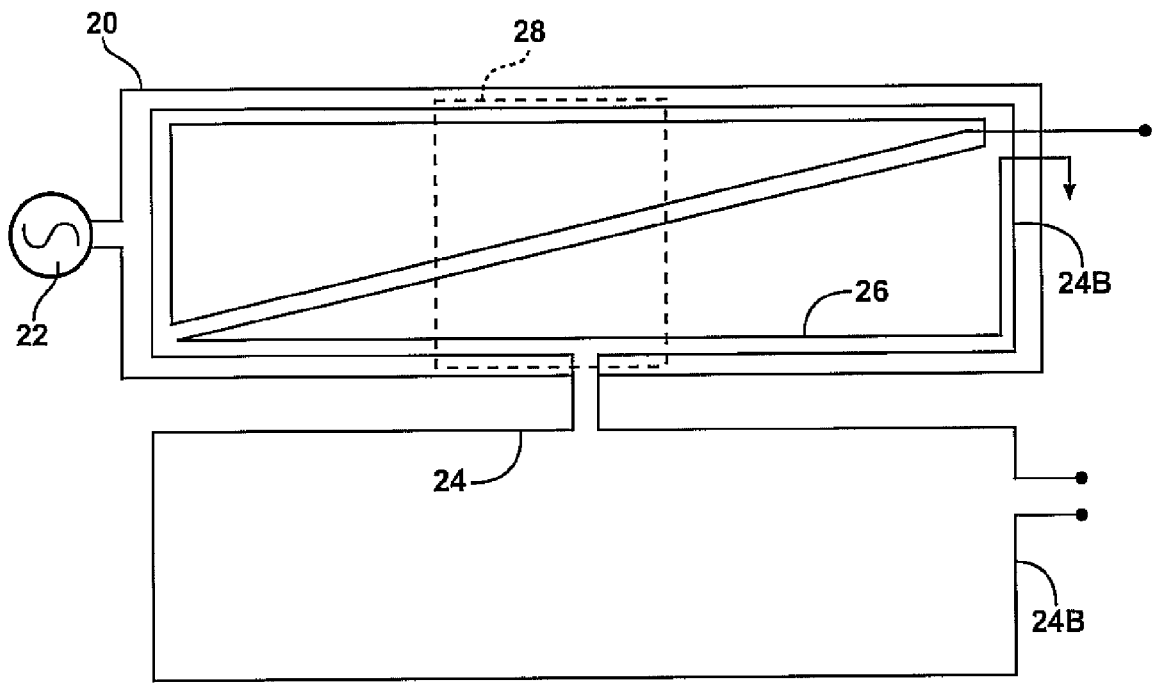
FIGS. 2A-2B show a linear inductive sensor in which a distance modulator has an outside section.

FIG. 2A shows another coil configuration, which for example may be used with a coupler element that has a generally plate-shaped structure. The coil configuration comprises exciter coil 20, excitation source 22, DM 24, and LM 26. The coupler element is shown at 28. In this example, the DM has an inside section substantially within the exciter coil, 24A, and an outside section 24B located outside of the exciter coil. The inside section and outside section have forward and backward sections. In this context, the terms forward and backward refer to the direction of induced voltage in each section due to inductive coupling with the exciter, and these are opposed as the flux direction outside the exciter coil is in the opposite direction from that inside the exciter coil. The magnetic flux density from the exciter coil is typically stronger inside the exciter coil, so that more turns may be required for the outside section of the DM.

The DM may not be sensitive enough to the gap distance, and one approach to this problem is to provide an unbalanced differential structure, which has a larger outside section than inside section, and/or more turns in the outside section. However, other approaches may be used as described later.

The signals from the inside section and outside section tend to cancel out, as part of a differential structure, and provide a signal correlated with the gap between the DM and exciter coil, in the axial direction. However, the signal from the DM is generally substantially independent of the position of the coupler element.

Figure 2B:
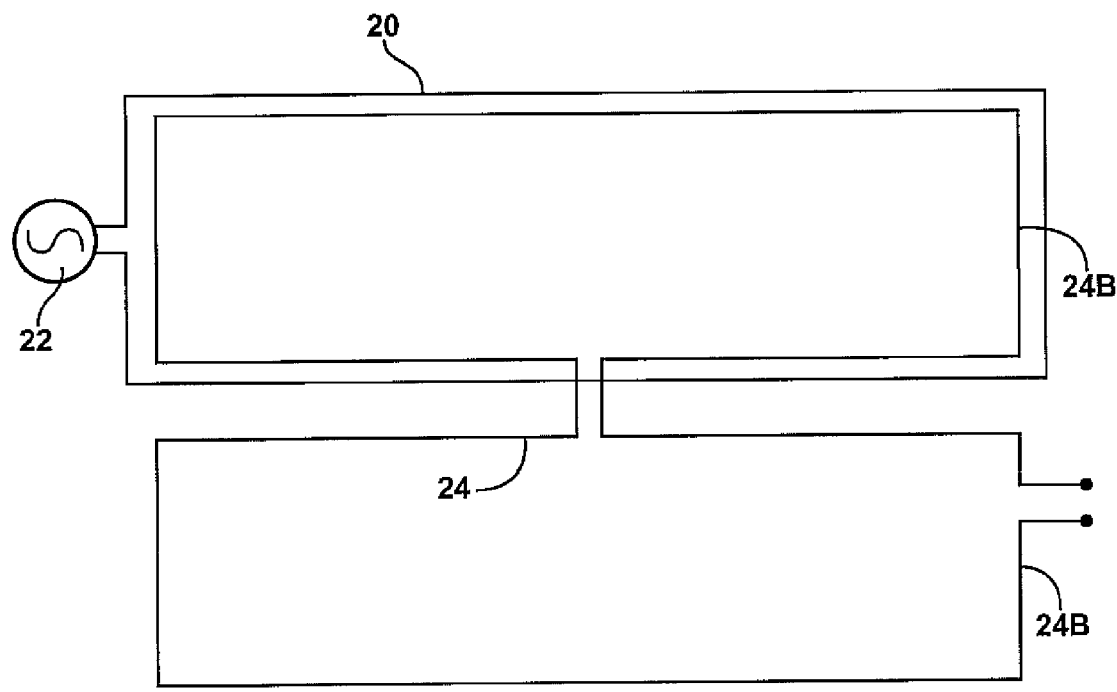

FIG. 2B shows the DM 24 alone, for clarity. The winding directions are the same for the two sections of the differential structure, as the flux direction from the exciter coil is reversed going from inside the exciter coil to outside.

Figure 3A:
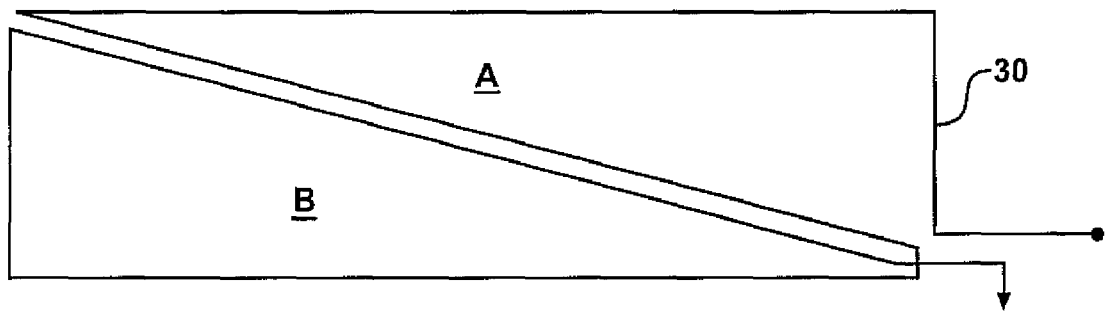
FIGS. 3A-3B show two configurations of a coil that may be used for a linear modulator.
Figure 3B:
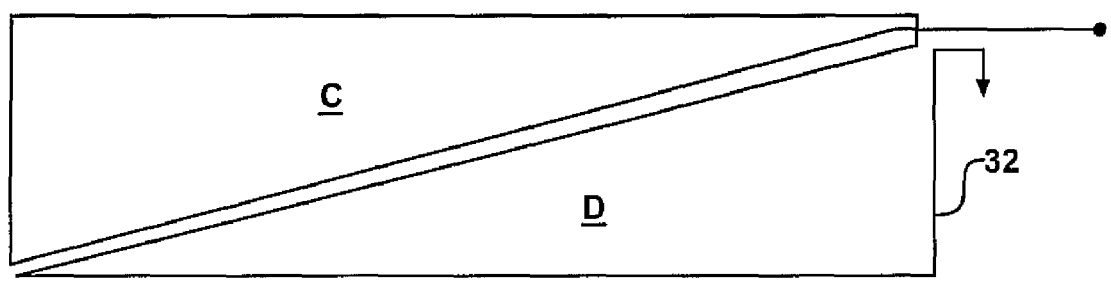

FIGS. 3A-3B show two possible LM coil configurations, the first coil 30 having sections A and B, and the second coil 32 having sections labeled C and D. The series connection of the two coils will provide twice the magnitude of output voltage of a single coil, other factors being identical.

Figure 4:
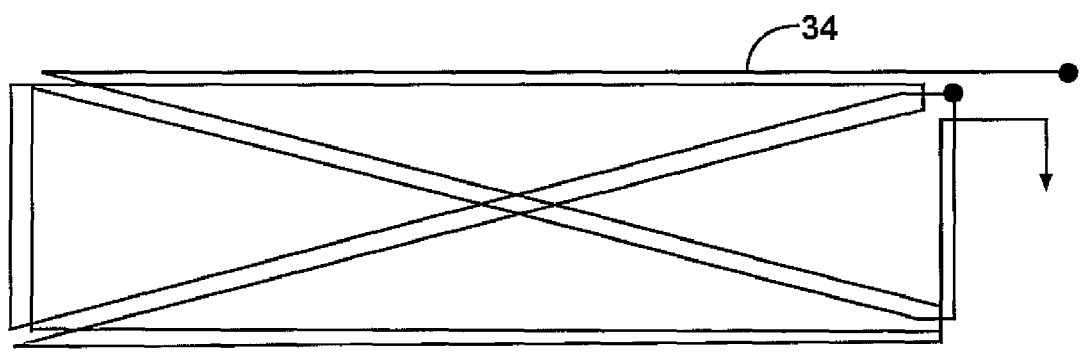
FIG. 4 shows a tilt compensating linear modulator.

FIG. 4 shows a LM coil 34 formed as a series connection of the two coils 30 and 32 illustrated in FIGS. 3A-3B. This configuration eliminates the effects of tilt of the coupler element relative to the plane of the LM. Examples of the present invention may include such a tilt compensating LM, particularly if the coupler element is substantially plate-like, not having a generally U-shaped configuration as shown in FIG. 1B. However, for illustrative simplicity, the simpler coil configuration, such as shown in FIG. 3 as coil 30, may be shown in various examples.

Figure 5:
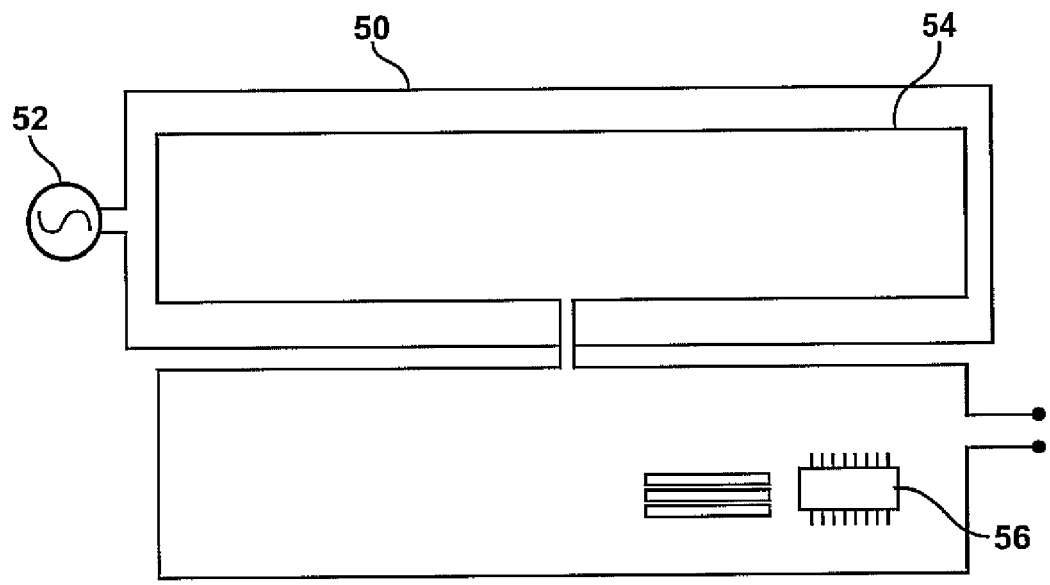
FIG. 5 illustrates how electronic circuitry can be contained within the outside section of a distance modulator.

FIG. 5 shows exciter coil 50, excitation source 52, and DM 54, in a coil assembly similar to that shown in FIG. 2. The coupler element and LM are not shown for clarity. This figure illustrates that electronic circuitry such as ASIC 56 can be located within the outside sections of the DM coil 54. The electronic circuitry has little effect on magnetic flux, and hence on the inductive coupling between the exciter coil and the DM.

Electronic circuits used may be similar to those described in our co-pending applications.

Figure 6:
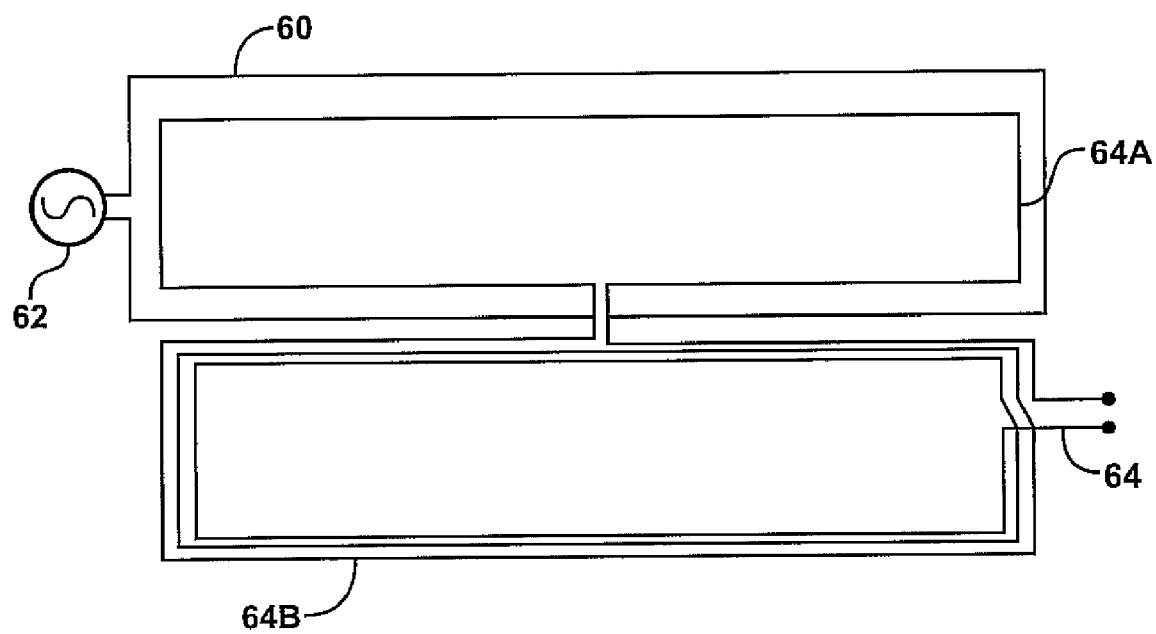
FIG. 6 shows a distance modulator having a greater number of turns in the outside section.

FIG. 6 shows a DM having more turns in the outside sections. The coil assembly comprises exciter coil 60, powered by excitation source 62, and DM 64. The coupler element and LM are not shown in this figure for clarity, but may be configured with respect to the exciter coil as shown above in FIG. 2A. The DM 64 has a single turn in the inside section 64A, and three turns in the outside section 64B. The terms inside and outside refer to sections inside and outside respectively of the perimeter of the exciter coil 60.

The inside section has, for example, a forward direction and the outside section has a backward direction. The use of the terms forward and backward simply indicates opposite senses of induced voltage within the sections.

Figure 7:
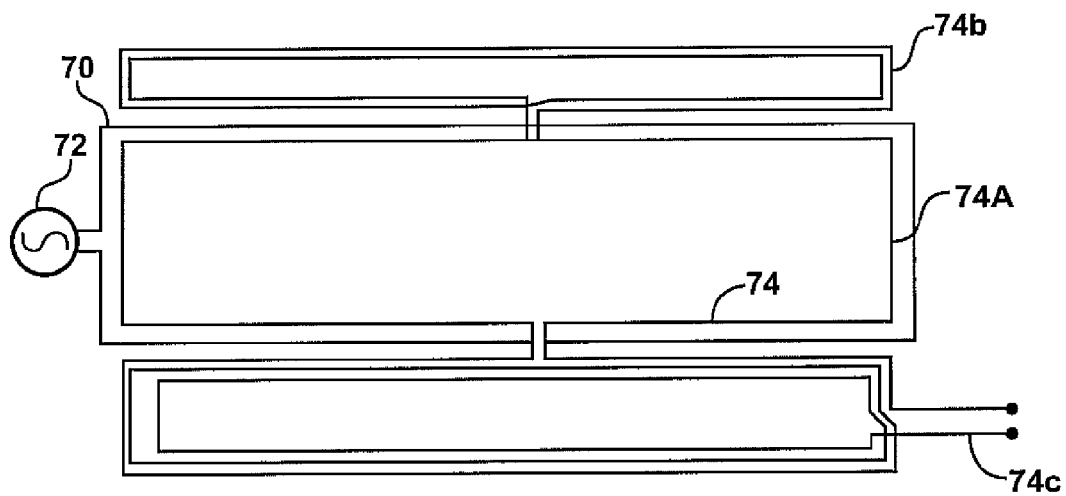
FIG. 7 shows a linear sensor in which the distance modulator has two sections outside the exciter coil.

FIG. 7 shows an exciter coil 70, excitation source 72, and DM coil 74. The DM configuration has an inside section (74A) and two outside sections (74B and 74C), above and below the inside section, as illustrated. The DM has a differential structure, the outside sections having, for example, a backwards section direction, and the inside section having a forward section direction. Again, in this context, the terms forwards and backwards are used to indicate the relative directions of induced voltages. The LM coil and coupler element are not shown for clarity.

If the DM has sections of one sense within the exciter coil, and one or more sections outside the exciter coil that have an opposed sense, the capacitive coupling with the exciter coil may be controlled. The DM design similar to that of FIG. 7 allows capacitive coupling effects to be controlled, so that the capacitive coupling between the exciter coil and the DM is similar to that between the exciter coil and the LM. More particularly, the capacitive coupling between the exciter coil and the forward/backwards sections of the DM cancel out. Referring again to FIG. 6, capacitive coupling between the exciter coil and the inside and outside sections of the DM may also be controlled, for example by the spacings between the turns of adjacent coil sections. This is discussed further in relation to FIG. 9.

Figure 8A:
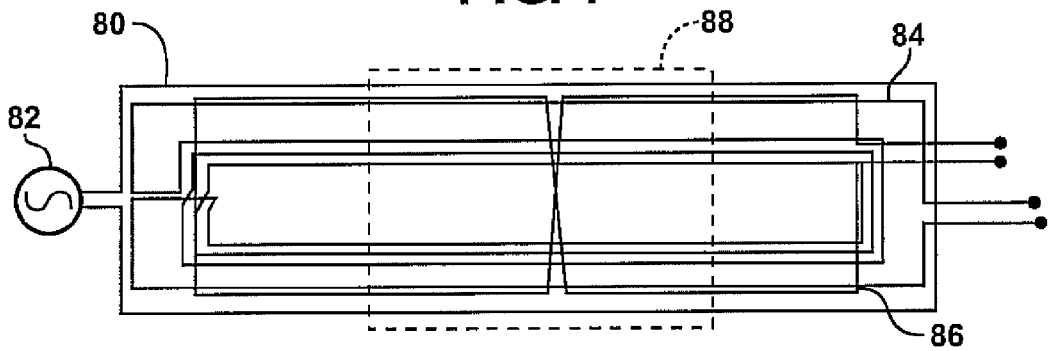
Figure 8B:
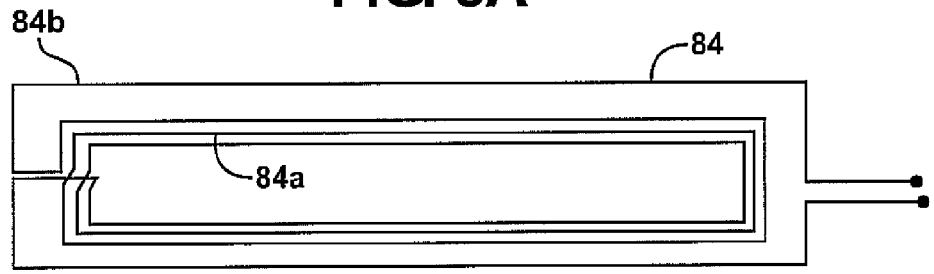
Figure 8C:
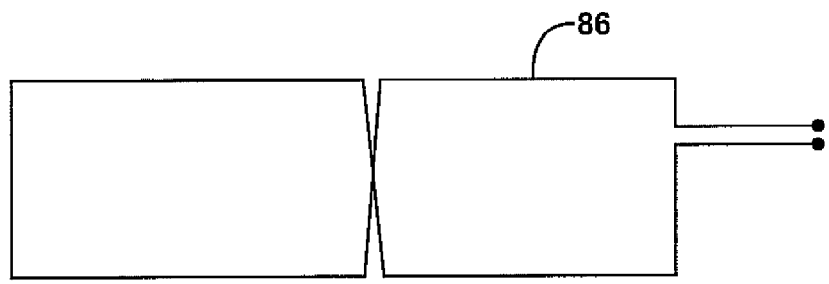

FIG. 8A-8C shows another configuration comprising excitation coil 80, excitation source 82, DM 84 and LM 86. A possible position of the coupler element is shown at 88, from where (as illustrated) it would move left or right. This design has a smaller gain and also a restricted range of positional measurements compared to, for example, the configuration of FIG. 6. However, the DM can be completely confined within the exciter coil.

FIG. 8B shows the DM 84 alone, for clarity. In this differential structure, there is an inside section defined by turns 84A, having a winding direction opposite to that of the outside section defined by turn 84B. In this example, both sections are inside the exciter coil, and so opposite turn directions are required for a differential structure.

FIG. 8C shows the LM 86 alone, for clarity. The LM has left and right sections (the terms left and right are used for convenience with respect to this illustration). In other examples the LM may have other structures, such as an overall bow-tie shape, or other configurations where the inductive coupling between the sections is modified as the coupler moves in such a manner as to allow the coupler position to be determined.

Figure 9:
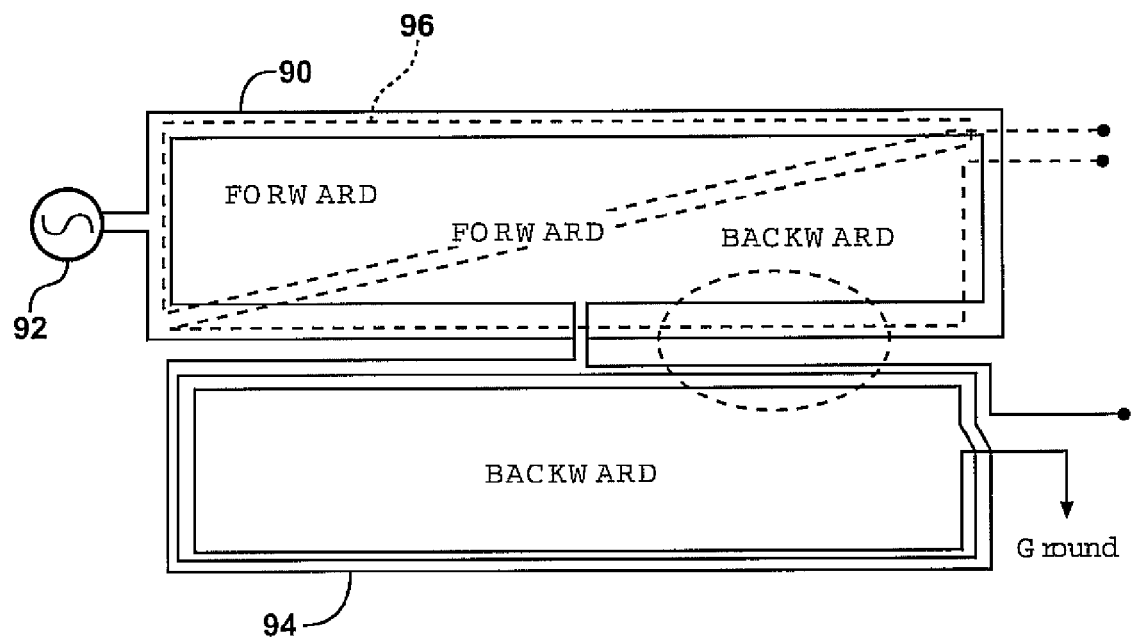
FIG. 9 shows a distance modulator having a ground connection in the outside section.

FIG. 9 shows a DM configuration with a ground connection to the outside section. The capacitive coupling is also affected by the location of the ground connection to the DM. The figure shows excitation coil 90, excitation source 92, and DM 94. The LM 96 is shown dashed, for clarity. The DM has both an inside section (i.e. inside the excitation coil) and an outside section of opposed handedness (sense) outside the excitation coil. In this case, the ground connection is made to the outside section. This tends to provide a higher impendence for capacitive coupling induced currents, as currents generated proximate to the exciter coil have a longer length to go through before arriving at the ground connection.

The inside section of the DM is a forward section, the outside section is backwards. The two sections of the LM are forwards and backwards, as shown upper left and lower right. In this example, to equalize capacitive couplings with the DM and LM, the forward section turn of the DM is inside the backwards section turn of the LM.

The dashed oval shows a region where there is capacitive coupling of the exciter to the backward section of the LM (inside the exciter coil), and the backward section of the DM (outside the exciter coil). In this region, the forward section of the DM is inside the LM, so capacitive coupling is with the exciter is less important. Hence, the effects of capacitive coupling on the LM and DM can controlled, and may be equalized, so that capacitive coupling becomes another common mode type factor, the effects of which on positional sensing can be largely eliminated by ratiometric sensing.

Figure 10:
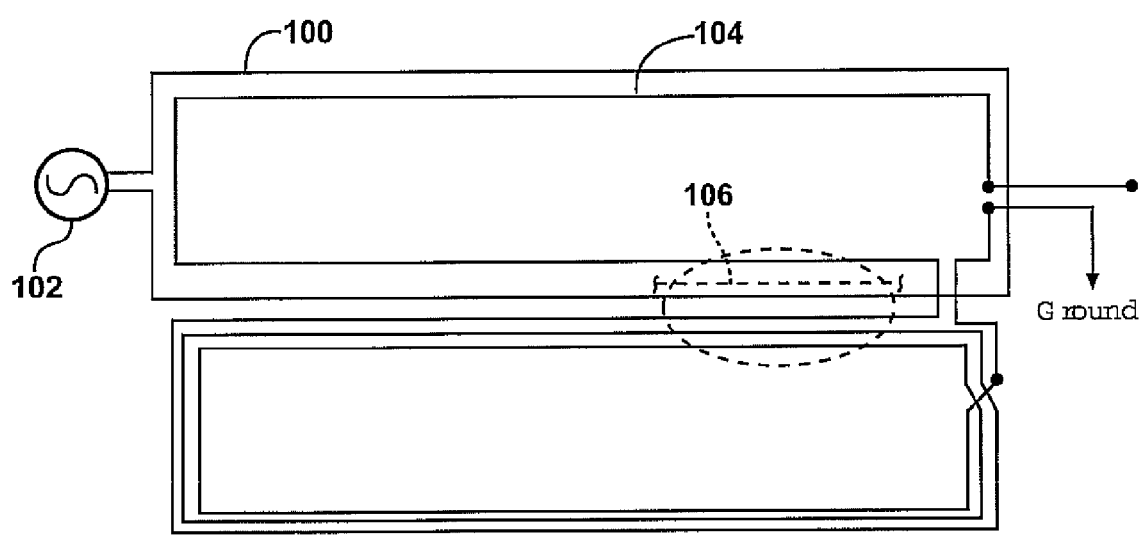
FIG. 10 shows the distance modulator having a ground connection in the inside section.

FIG. 10 shows a configuration very similar to that of FIG. 9, but with the ground connection made to the inside section. The figure shows excitation coil 100, excitation source 102 and DM 104, the DM having inside and outside sections of opposed senses, the ground connection being made to the inside section. The LM is not shown, but may be configured similarly to FIG. 9, for example with section turn portion 106 between the inside section of the DM and the exciter coil.

The configuration of FIG. 10 exhibits low impedance, compared to that of FIG. 9, as the capacitive coupling induced currents has a shorter distance to travel to ground.

For larger ranges of distance sensing, the relative size of the coupler element compared with the area of the receiver coil tends to be small, for example, in comparison to rotational sensors where the coupler element may typically be approximately half the size of the receiver coil (in this case, the rotational modulator). Due to the small size of the coupler element, the inductive coupling variation with the DM may not be great enough for compensation of gap variations.

However, the gap sensitivity of the DM signal may be enhanced by forming a resonant circuit including the DM coil as an inductor. For example, a capacitor may be provided in series (or in parallel) to form the resonant circuit. Further, a resistor may be provided in series to adjust the quality factor (Q).

Figure 11:
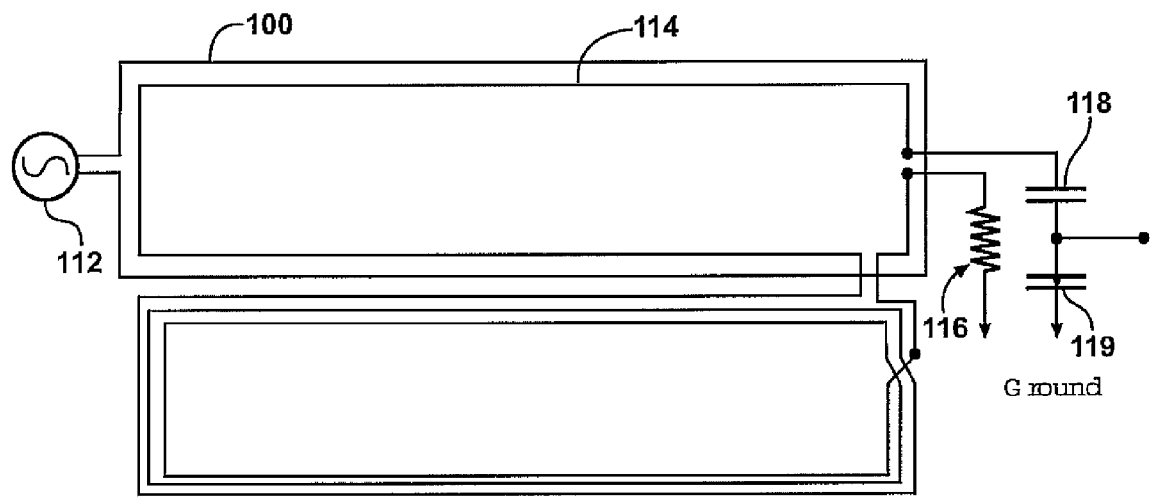
FIG. 11 shows a resonant circuit including the distance modulator.

FIG. 11 shows a possible configuration, comprising exciter coil 110, excitation source 112, DM 114, resistor 116, and capacitors 118 and 119. The pair of capacitors provides a voltage divider for conditioning the input to, for example, a ratiometric circuit. This circuit allows a smaller coupler element to be used.

Hence, an improved configuration for providing a common mode or reference signal reference coil comprises a reference coil generally co-planar with the receiver coil, and at least one capacitor to form a resonant circuit, and optionally a resistor to modify the Q-factor of the resonant circuit.

Figure 12:
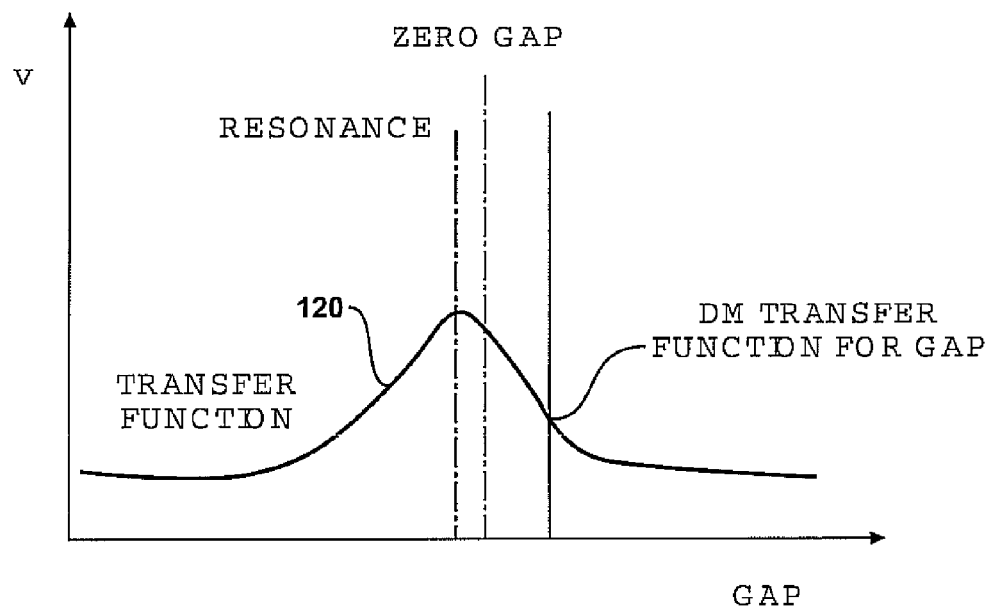
FIG. 12 shows a transfer function of voltage output from the distance modulator against gap.

FIG. 12 shows a representative curve 120 of induced voltage within the DM vs. gap. The inductance of the DM varies with the gap (physical separation) from the coupler element. In this example, the resonant frequency is adjusted so that zero gap corresponds to a point just on the downslope of this transfer function of voltage versus gap, i.e. slightly to the right of the resonant peak. This is the line labeled "zero gap". The slope of the downslope may be varied by adjusting the resistor. Hence, the gap dependency of DM voltage output is enhanced by the transfer function slope at the actual value of gap used (the point labeled "DM transfer function for gap").

Examples described so far have generally been linear sensors; however, embodiments of the present invention also include partially or completely rotational position sensors.

Figure 13A:
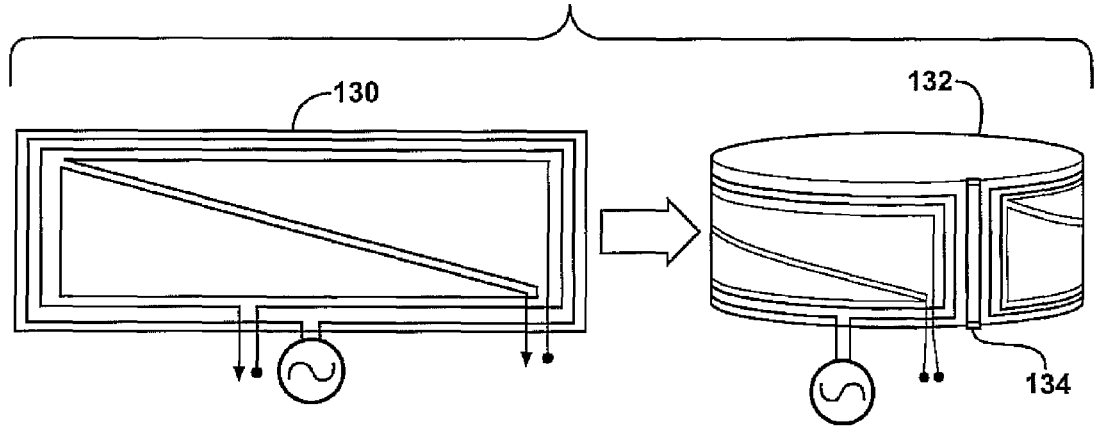
FIGS. 13A-13B show transformation of a linear sensor configuration to a cylindrical geometry for rotational sensor.

FIG. 13A shows transformations of generally planar coil assemblies, for example, that of FIG. 1A, to cylindrical forms. In this case, the planar form is shown as rectangle 130 and the cylindrical form would be projected onto curved surface 132. The separation 134 may have minimal effect.

Figure 27:
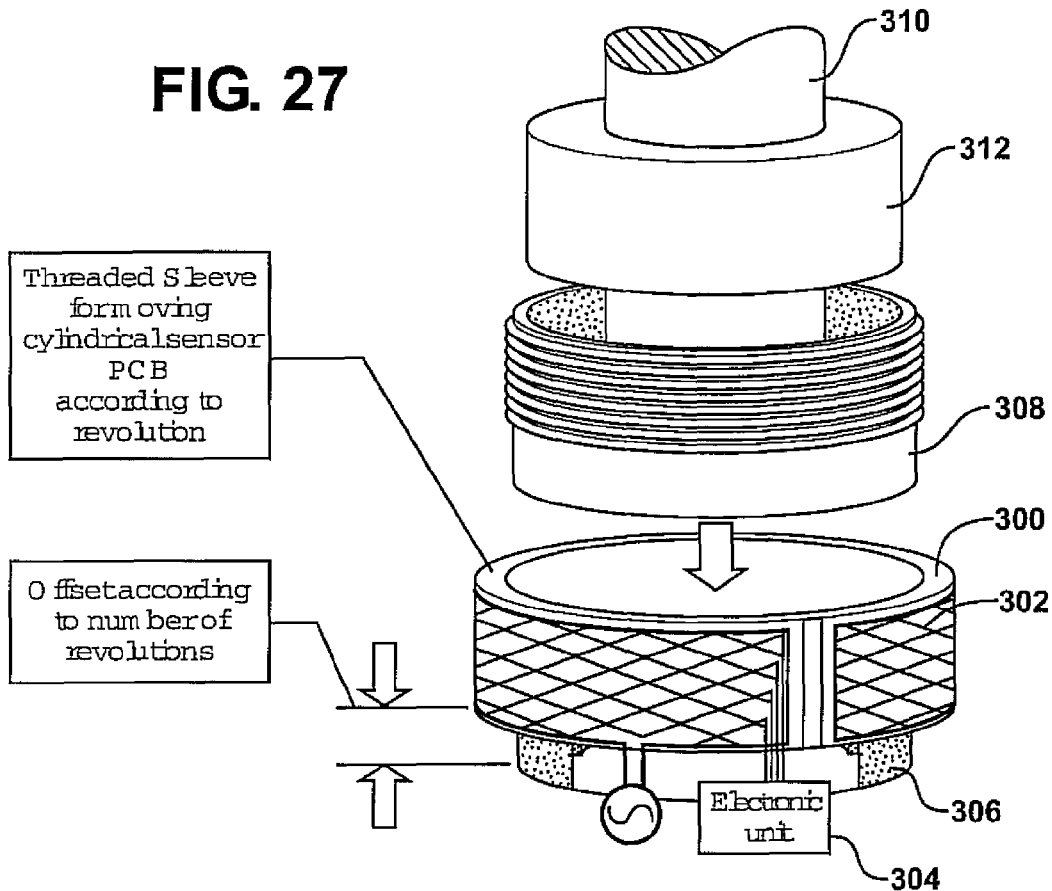
FIG. 27 illustrates a rotational sensor using a cylindrical geometry coil assembly.
Figure 28:
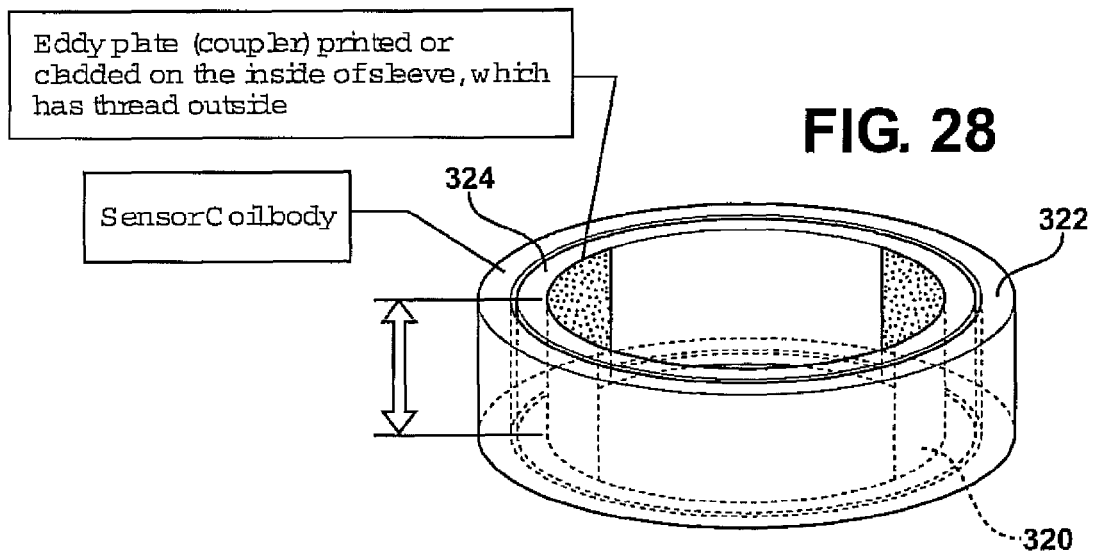
FIG. 28 illustrates attachment of a coupler to a rotating sleeve for rotational sensing with a cylindrical geometry.

The geometry of the linear sensor can be transformed to that of a rotational sensor, which is tolerant gap variations due to the symmetry of gaps between the sensor windings (coil assembly) having a generally cylindrical form, and concentric coupler elements For example, see FIGS. 27 and 28.

The sensor performs in a similar manner after such as geometrical change. Preferably, the coupler has now two coupler elements (or eddy plates) displaced symmetrically as shown at 138 and 140. This type of sensor can be used as a partial or complete rotational sensor, as discussed further below.

Figure 13B:
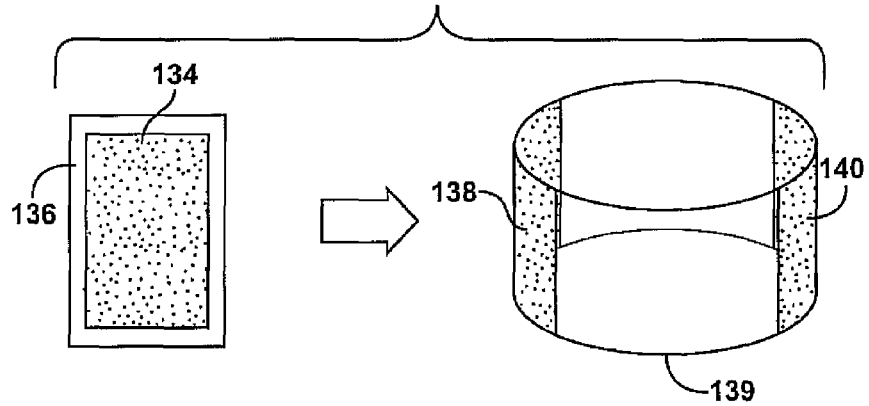

FIG. 13B shows associated transformations of a coupler element 134 supported on object 136 to coupler element 138 having a generally cylindrical geometry.

Figure 14A:
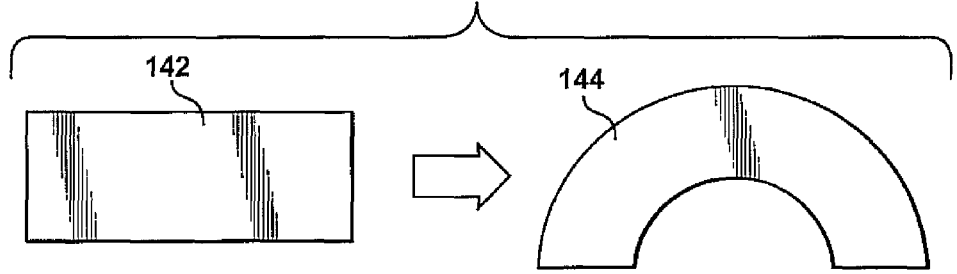
FIGS. 14A-14C illustrate transformations from linear to partial rotational configurations, and also for complete rotational sensors.
Figure 14B:
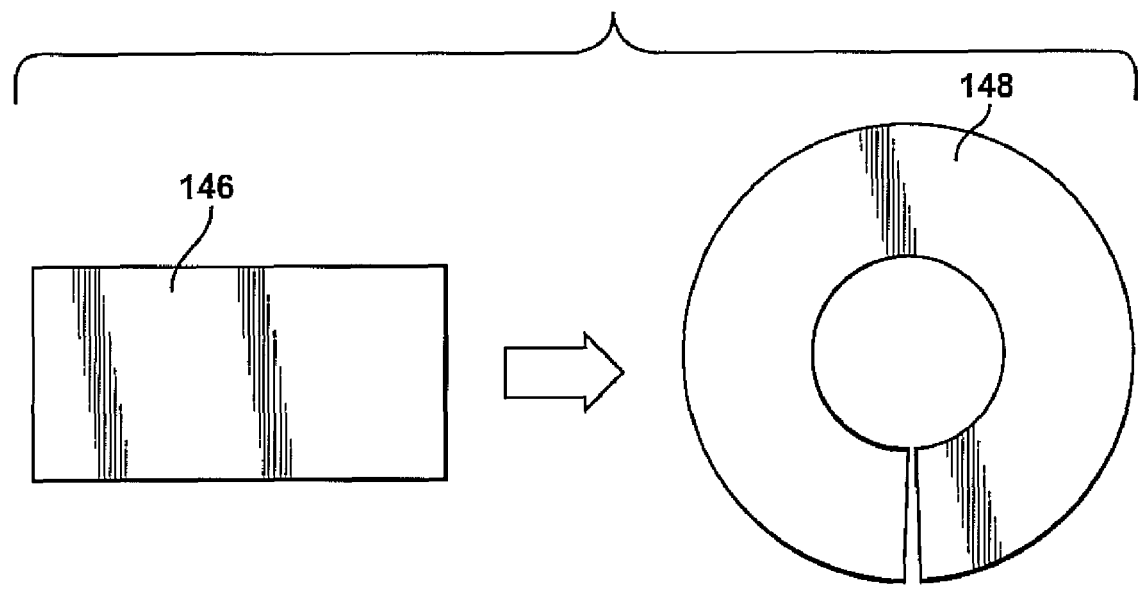
Figure 14C:
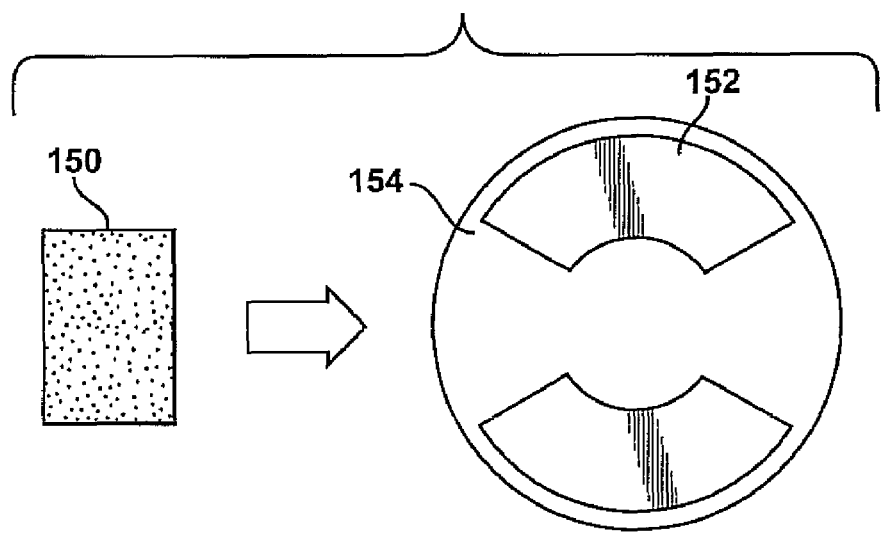

FIGS. 14A-14C show transformations for rotational sensors, the rotation occurring within the plane of the figures. For example, rectangle 142 may correspond to the general shape of the coil assembly shown in FIG. 1A, and this may be transformed into generally arc-shaped, but planar form 144. This type of transformation may be used to obtain a topology suitable for a partial rotational sensor, i.e., a sensor sensitive to movements that include both linear and rotational components.

FIGS. 14B and 14C show corresponding transformations to a topology suitable for rotational sensors, including sensors for motion that is completely rotational with no linear component. For example, rectangle 146 corresponds to the general shape of a coil assembly similar to that of FIG. 1A, for example, transformed to circular shape 148. Similarly, a rectangular coupler element 115 is transformed to one or more generally arc shaped segments 152, supported by rotating object 154. In this example, rotation of object 154 is detected by the curved coil assembly 148.

Linear sensors for longer linear movements can be obtained using a linear modulator coil (LMs) having more than two sections. The use of two LMs readily allows a continuous positional signal output to be obtained.

Figure 15:
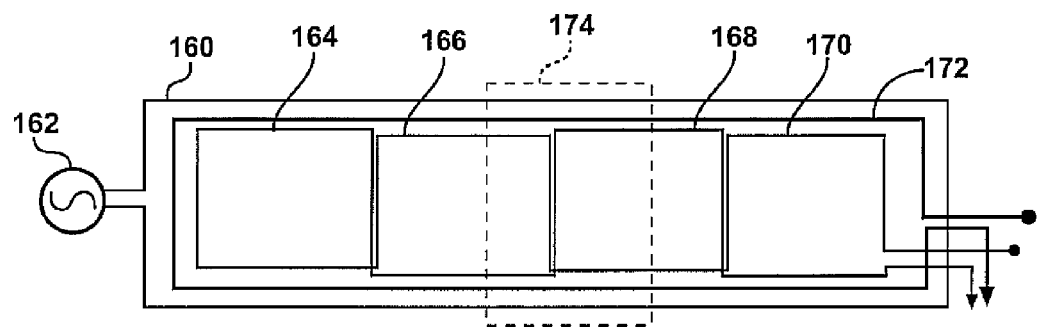
FIG. 15 shows a configuration for linear sensing over longer distances.

FIG. 15 shows a coil assembly including exciter coil 160, excitation source 162, and LM including multiple sections 164, 166, 168 and 170. In this case, the adjacent sections have opposite handedness, for example, alternating anti-clockwise/clockwise sections. In this example, the LM may be said to be a four-pole coil, having four poles or sections.

The coupler element may be a plate, or generally U-shaped structure, for example, as shown in FIG. 1B. A possible coupler position is shown dashed at 174. As illustrated, the coupler element moves in a generally left-to-right direction, modifying the inductive coupling between the exciter coil and the four sections.

Figure 16:
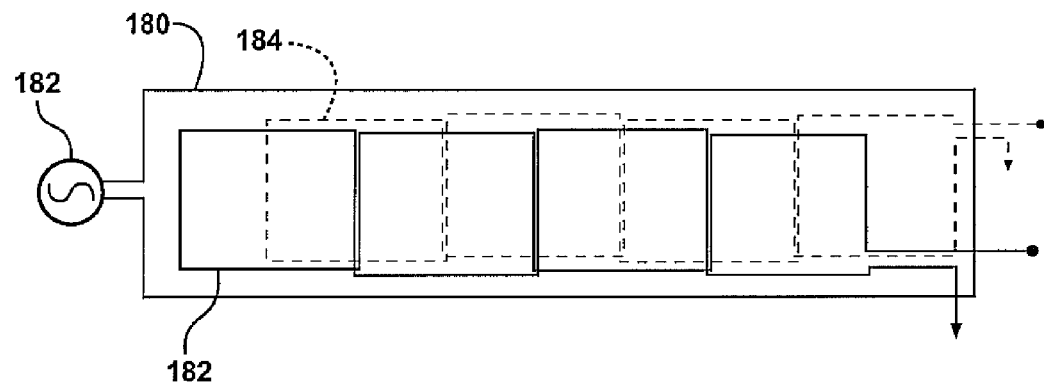
FIG. 16 shows an alternative configuration for linear sensing over larger distances.

FIG. 16 shows an alternative configuration having exciter coil 180, excitation source 182, and two four-pole LM coils, in which corresponding sections are overlapped by about half the area of each section. The second LM 184 is shown dashed to more clearly show its position relative to the first LM 182. The DM and coupler are not shown.

Figure 17:
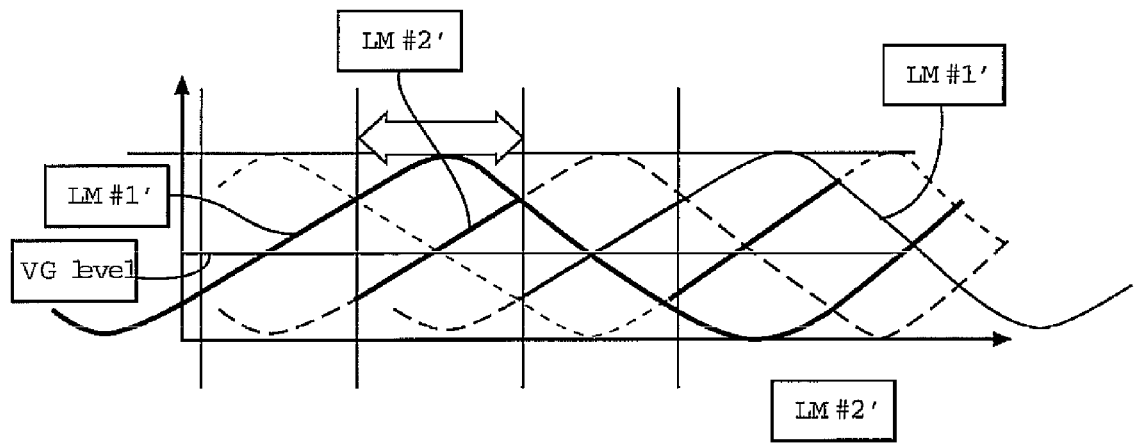
FIG. 17 shows signals from a 4-LM sensor coil configuration, the two solid curves from two LMs, the two broken curves are the inverse signals.

FIG. 17 shows four signals obtained from the two LMs of the configuration shown in FIG. 16, corresponding to signals and inverted signals from each LM. Hence, a linear signal can be obtained by piecing together the indicated linear segments obtained from the normal and inverted signals, respectively. An electronic circuit for this type of piecing together of linear segments is further described in our co-pending applications.

The curve LM#1 is obtained from the first LM, 182, and the curve LM#2 is obtained from second LM 184. LM#1' and LM#2' are the inverted versions. Each signal is periodic, with substantially linear sections shown as thicker sloping lines about a virtual ground (VG) level.

Inductive Sensors with DM Signal Provided by LM Coils

Using an electronic circuit, a distance signal can be generated from LM coils, so that a separate DM coil is not necessary. The DM signal can be provided by either one or more dedicated DM coils, or combination of LM coils. In the latter case, the coil assembly may comprise an exciter coil and a number of coils of the same type, the signals from which can be used to obtain both a DM signal and one or more LM signals. A position signal is generated by an electronic circuit, which is a ratiometric signal obtained from the DM signal and a LM signal (which may be selected from a set of LM signals). The signal from each LM undergoes phase sensitive rectification to give a signal for linear position determination, and a combination of non-phase-sensitive rectified signals are used to give a signal correlated with gap, but not with coupler position.

Figure 18:
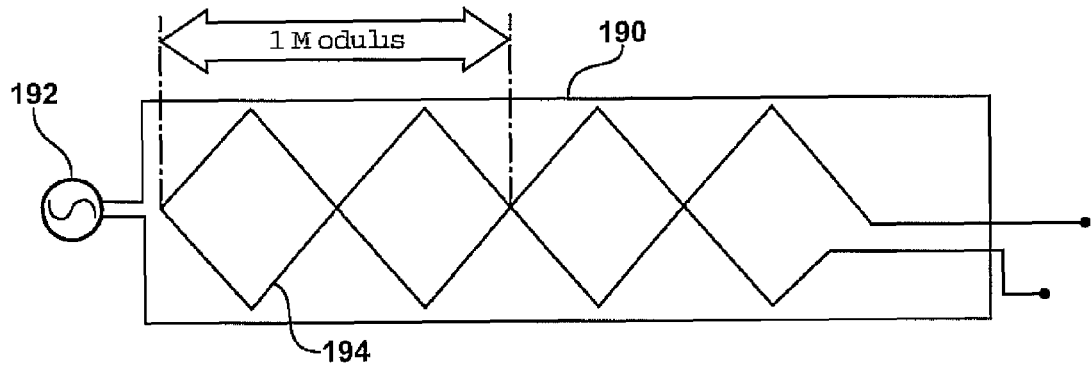
FIGS. 18, 19A, and 19B illustrate further configurations for linear sensing over larger distances.

FIG. 18 shows a coil assembly comprising exciter coil 190, with excitation source 192, and a four-pole LM 194. The repeating structure of the LM means that a unique signal is only obtained over a limited range, indicated by the double arrow labeled "one modulus".

With a given number of poles (sections), an LM can measure position over a certain distance, the modulus, outside of which the signal either becomes nonlinear or repeats itself in the case of coupler element travel over additional sections. Measurement of an extended distance can be measured by keeping track of the number of modulus distances traveled using the repeating structure of the coil(s), or using other information from which the number of modulus distances traveled can be determined.

Figure 19A:
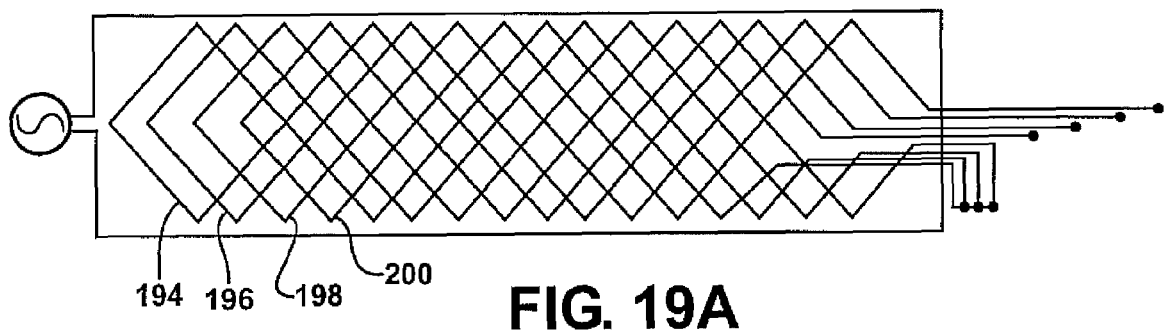

FIG. 19A shows a configuration having four LMs, each LM being a four-pole coil. The four LMs are 194 (the same as shown in FIG. 18), 196, 198, and 200. The exciter coil 190 is the same as in FIG. 18.

This combination of 4 LMs allows the common mode signal (gap or distance signal) to be determined without the need for a specialized DM coil.

Figure 19B:
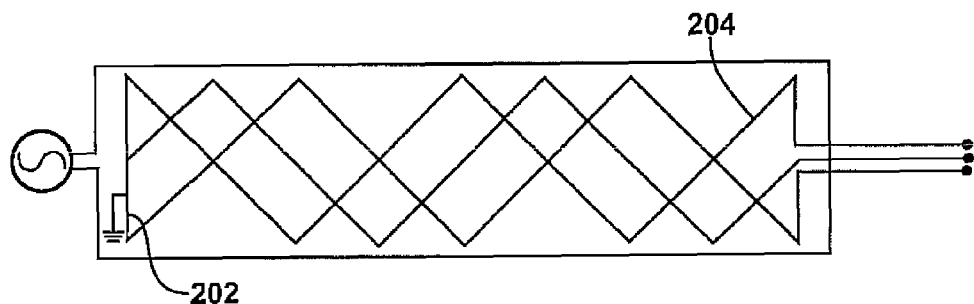

FIG. 19B shows another type of coil winding where return wires are truncated at one side of the coil-assembly, to simplify connections. This approach to simplifying connections is known in the art. This configuration allows as many LM coils as needed for the different phases of the signals for the signal processing. All the return wires of LMs are connected at the one end of coil set (at the left end).

FIGS. 18 and 19A show differential coils, from which signal picking, to obtain a linear positional response is simple, but there are many return wires in the configuration of FIG. 19A, simplified in FIG. 19B. Analog ratiometric signal processing may be used to obtain a positional signal compensated for common mode factors.

The linear positional signal can be obtained from the signals provided by each LM. The gap signal, in other examples provided by a separate DM coil, is in this case provided by non-phase-sensitive rectification of two or more individual LM coils signals, with subsequent combination of the rectified signals.

In this example, four LM coils such as shown in FIG. 18 are displaced a ⅛ of the modulus distance relative to each other. Phase sensitive rectification is used to generate 4 signals from the LM coils, denoted LM1, LM2, LM3, and LM4. These four signals are used for finding position. At the same time, the signal from each LM is rectified without phase sensitivity, as in RMS evaluation, denoted Vc1, Vc2, Vc3, and Vc4. The DM information is found from the combination of Vc1, Vc2, Vc3, and Vc4 to correct for common mode factors such as gap or offset. The DM-equivalent signal may also be referred to as a common mode signal or reference signal, and is the equivalent of the reference signal described in our co-pending applications, and may similarly be used for ratiometric sensing.

Hence the function of the DM coil is given by a combination of LM coils, which are also used for multi-modulus linear positioning. A separate "specialized" DM coil is not required. Instead, a circuit for non-phase sensitive rectification creates the common mode signal. Having obtained the common-mode signal, it can be used in ratiometric sensing. Consequently there is no physical DM coil, the coil body is simplified, and a true common mode signal is obtained which can be used for common-mode correction.

Figure 20:
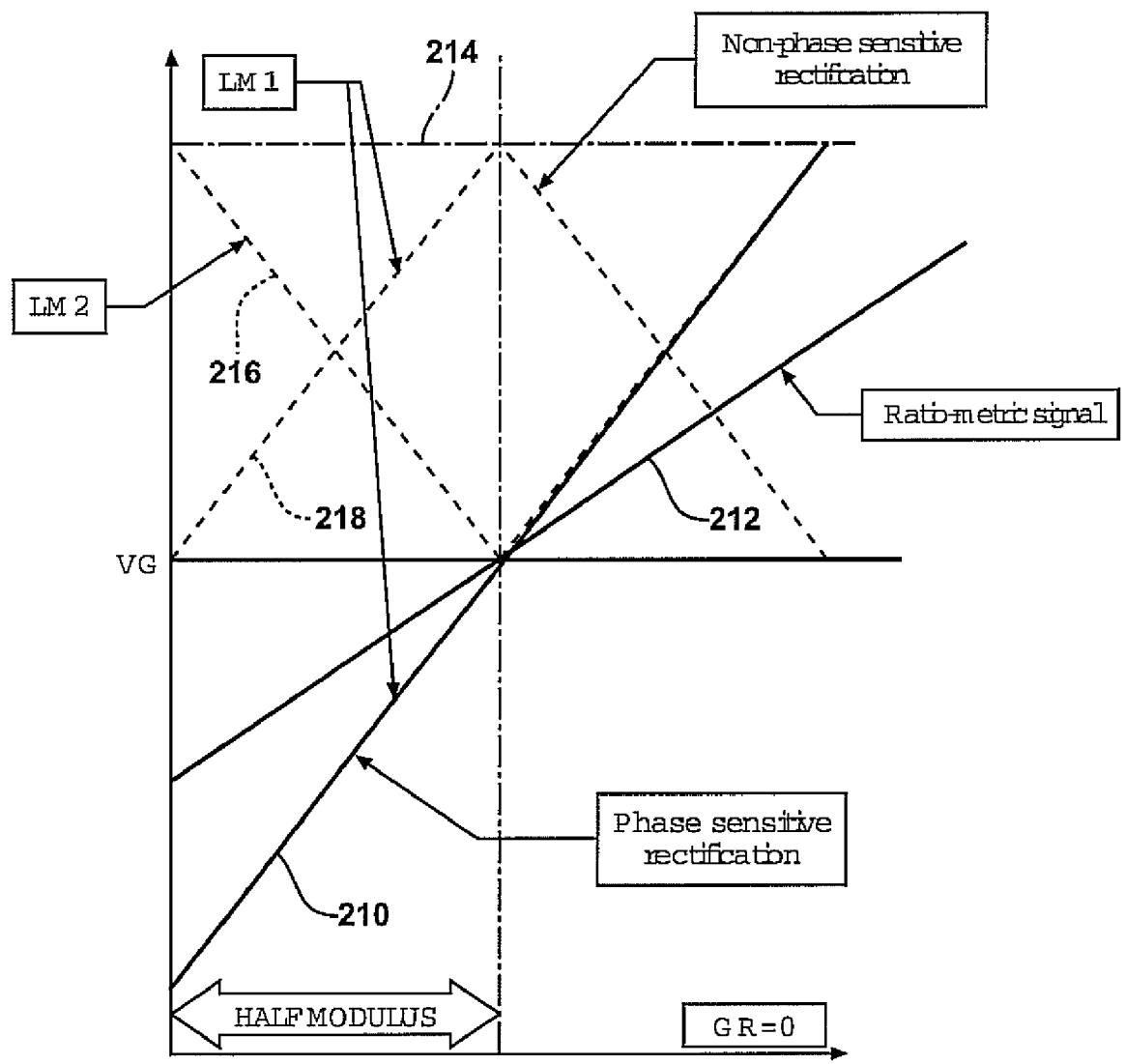
FIG. 20 illustrates non-phase sensitive rectification of LM signals to give a common mode signal.

FIG. 20 is a graph showing phase-sensitive rectification of the LM1 signal (line 210), which is substantially linear as a function of coupler position (the x-axis). The y axis is voltage, and VG is the virtual ground The signals obtained by phase-insensitive rectification of the LM1 and LM2 signals are shown as dashed lines 216 and 218. Combining (in this case adding) these signals gives a common mode signal 214, which is substantially independent of coupler position. Division of the signal 210 by common mode signal 214 gives ratio-metric signal 212, which is the position signal provided by the sensor. The division may be either analog or digital division, as described in our co-pending applications. The division operation is not necessarily an analog division, but may be performed in a digital manner via micro-computer.

Electronic circuits described in our co-pending applications may be used in embodiments of the present invention, for example as adapted by the addition of a non-phase-sensitive rectifier (and optionally a signal combiner such as a voltage adder) to give the common mode signal, which may also be referred to as a reference signal, which is subsequently handled like the reference signal described in our co-pending applications. For example, our co-pending U.S. provisional patent application, "Steering Angle Sensor" to the same inventor, filed Jun. 26, 2006, is incorporated herein by reference. That application, in part, describes a disk sensor with gap detecting to sense the multiple turns (beyond one modulus, where the modulus is the range over which a unique receiver coil signal can be obtained). Embodiments of the present invention include a cylindrical sensor with an offset detection to sense the multiple turns (beyond one modulus), as described in relation to FIG. 27 below. The offset is substantially parallel to the central long axis of the cylindrical form of the coil assembly, the axis of rotation.

Figure 21:
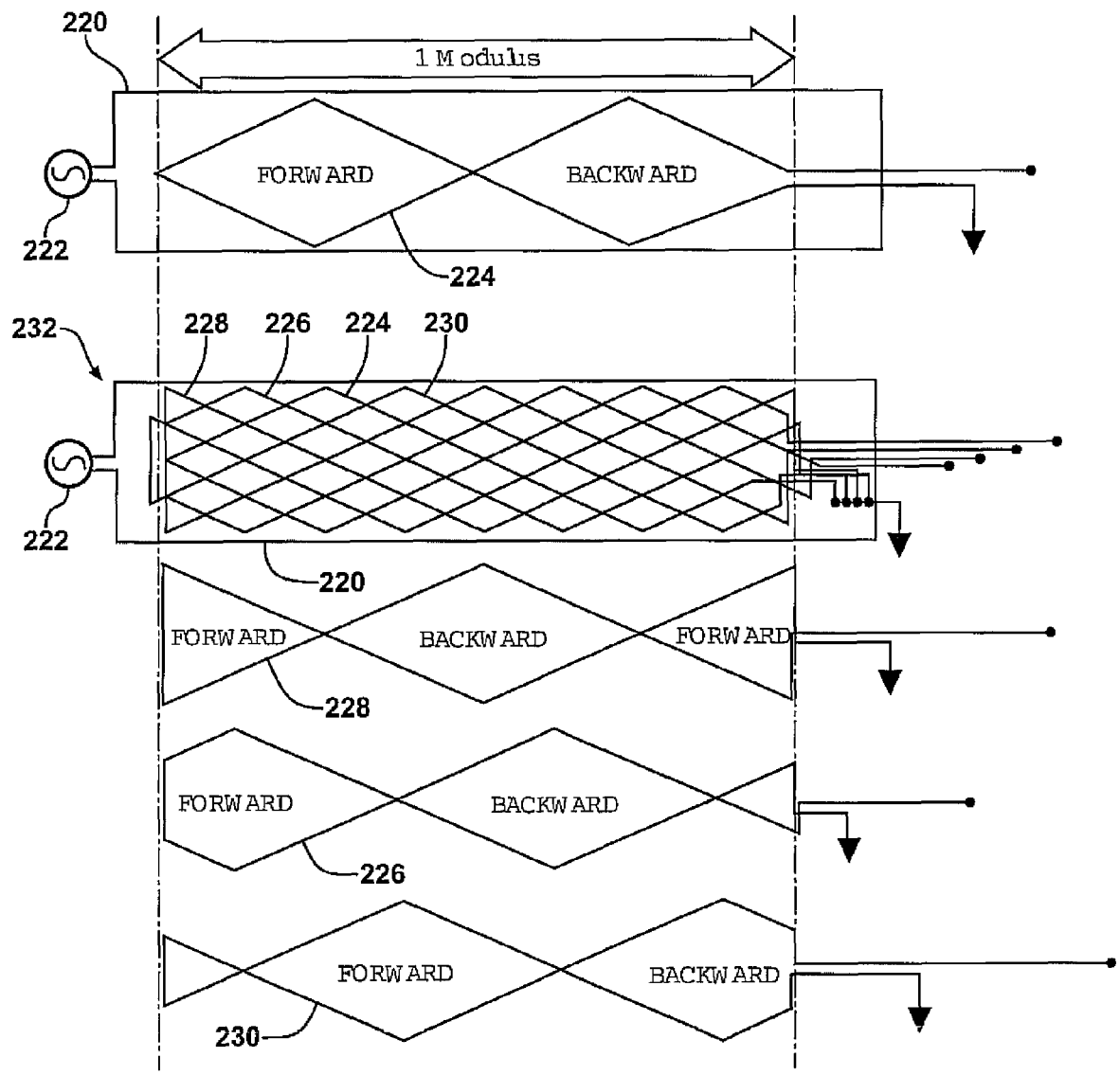
FIGS. 21-23 illustrate further configurations for linear sensing, which do not need a separate DM coil.

FIG. 21 shows another configuration, including exciter coil 220, excitation source 222, first LM 224, second LM 226, third LM 228, and fourth LM 230. The figure shows the entire coil assembly at 232, with the coupler element not shown. The figure also shows, for clarity, the LM coils individually, along with the handedness (forward of backward) of each section of the LMs. The first LM, 224, has two sections, and the sections of the other LMs are displaced relative to this. The other LMs each have three sections, but the first and last sections of each LM are truncated at the ends of the coil assembly so as to be the same length, overall, as the first LM.

These LM windings provide a sinusoidal dependency of LM signal against position. For the compact use of inside area of the exciter coil, the LM coil is modified as long as the balance of forward and backward winding area is maintained. The balance means the ratio forward and backward areas being such that the induced voltage of the coil is zero without the coupler. The figure shows an example of 2 pole sensor windings for sinusoidal waves. The grounding scheme is modified in order to reduce the crossovers (the return wires of LM crossing the exciter) of LM return wires.

Figure 22:
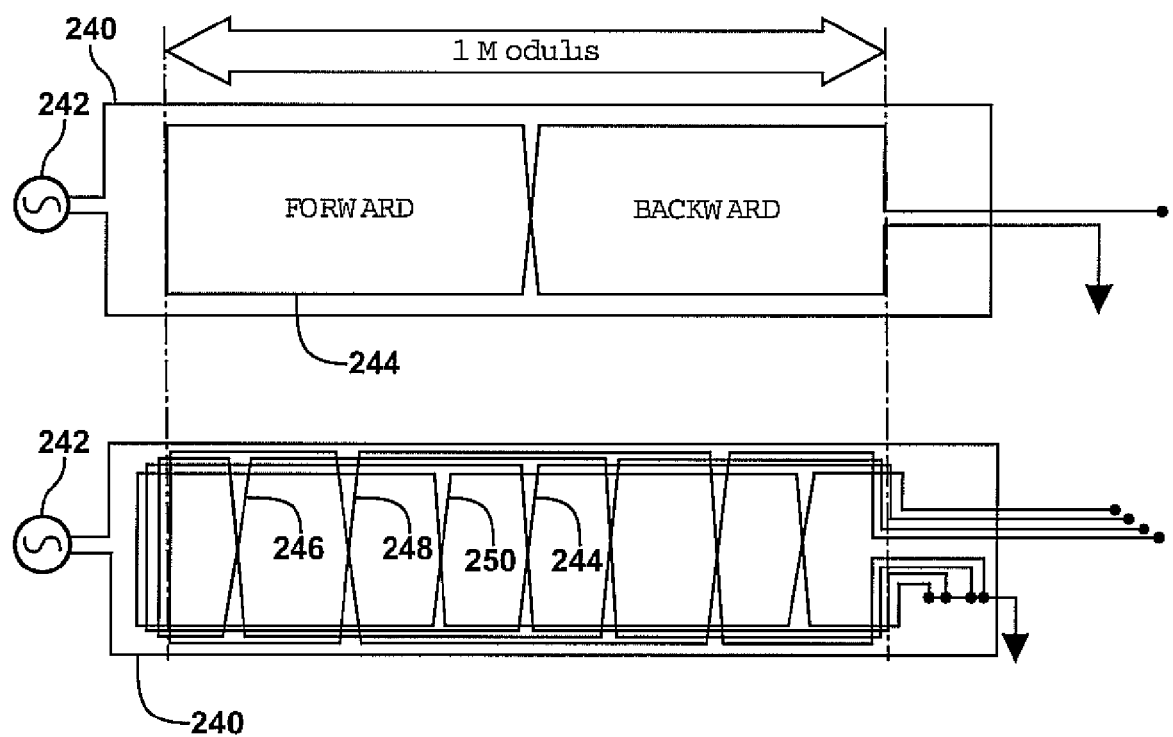

FIG. 22 shows a configuration similar to that of FIG. 21, the LMs having sections of a slightly different shape. This includes exciter coil 240, excitation source 242, LM 244 (the upper diagram shows only the first LM, the lower diagram shows all LMs), and other LMs 246, 248, and 250. This configuration gives of 2 pole LMs gives a triangular wave dependence of output voltage versus position.

Figure 23:
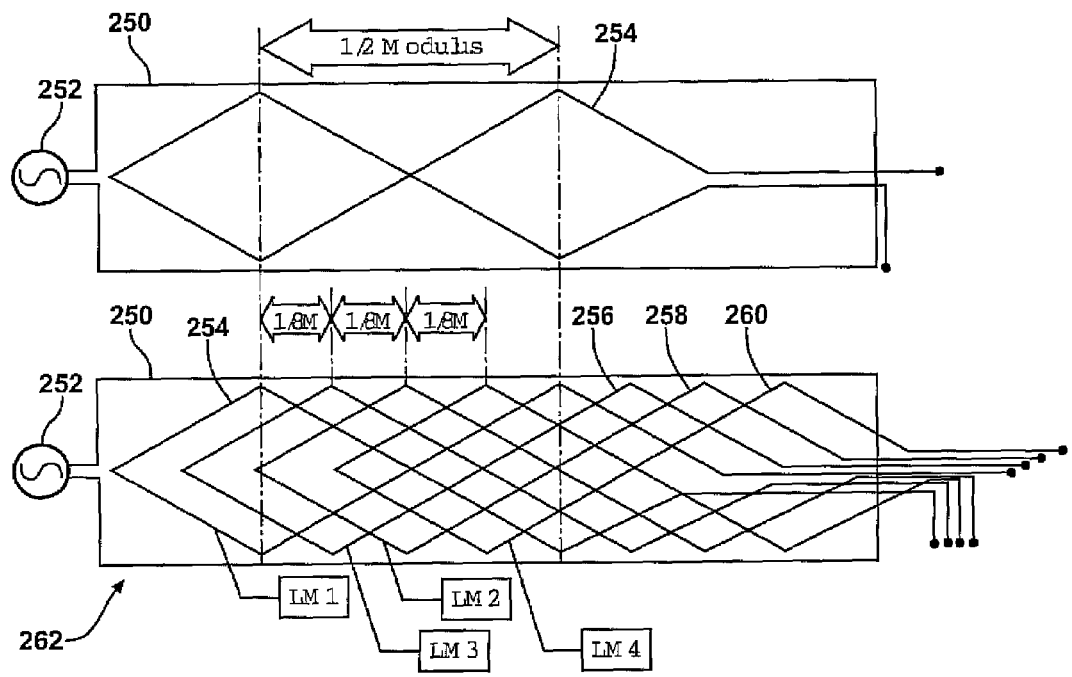

FIG. 23 shows another configuration, similar to FIG. 21. The figure shows the entire coil configuration at 262, comprising exciter coil 250 (with excitation source 252), LMs 254, 256, 258, and 260. In order to generate a DM signal for the ratio-metric signal, all the LM signals from (254, 256, 258, and 260) are rectified in phase insensitive manner and combined to get the signal of 214 in FIG. 20. Any one of the signal of LMs can be rectified in phase sensitive manner to get the linear signal as in 210 of FIG. 20.

Then the ratio (division 210 by 214) of the two signals can be obtained as a sensor signal, which is free from any common mode signal, such as noise, gap, offset (e.g. along an orthogonal direction to the gap), or EMI interference. This approach may be used for any example of DM-free ratio-metric sensing.

Figure 24:
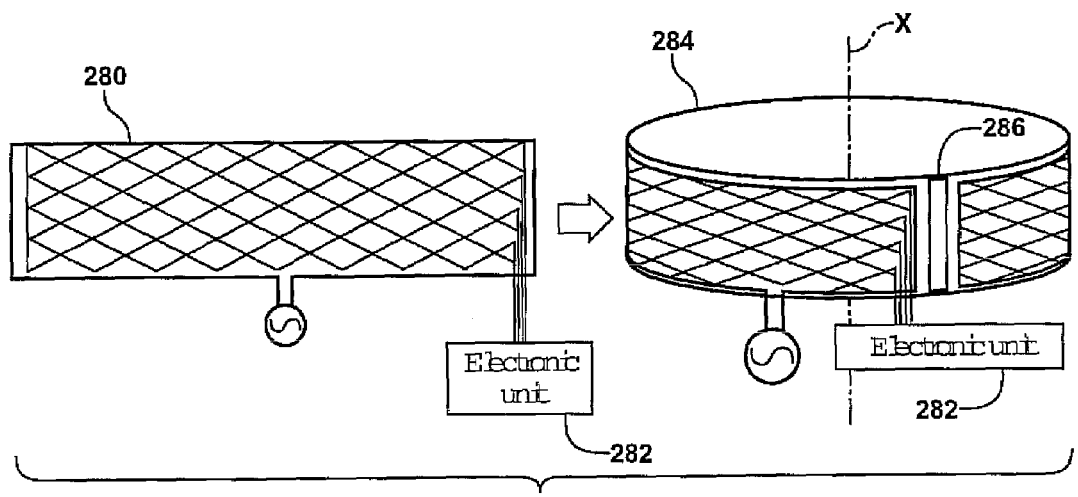
FIG. 24 shows geometrical transformation to a cylindrical geometry, for a ratiometric rotational sensor without need for a separate DM coil.

FIG. 24 shows a geometric transformation from a linear sensor to a cylindrical geometry for a rotational sensor, Coil assembly 280 is similar to that shown in FIG. 21 (coil assembly 232). If the substrate is flexible, for example a flexible polymer, the sensor may be formed into cylindrical form 284. The electronic circuitry 282 may be the same in both cases. The coupler element is not shown, but may be a curved plate rotating about central axis (X) either inside our outside the coil assembly. Two coupler elements may be used, as shown in FIG. 13B.

The configurations of FIGS. 21-24 can be used without a specialized DM coil, as a common mode signal can be obtained by non-phase-sensitive rectification of the LM signals. The positional data is obtained using phase sensitive rectification of the LM figures.

The cylindrical geometry of FIG. 24 is less sensitive to the effects of ferromagnetic materials, either inside or outside the coil assembly. With this configuration of the sensing coils, the effects of surrounding or cores of ferromagnetic materials on the receiver coils can be significantly reduced. If the DM coil and LM are the same geometrical shape, the coils respond in the same manner. Hence, by obtaining the reference signal from the LM coils, improved ratiometric sensing is possible.

There may be edge-gap 286 between the two edges. If this gap can be eliminated effectively by, for example, an overlap, multi-turn sensors can also be made.

Figure 25:
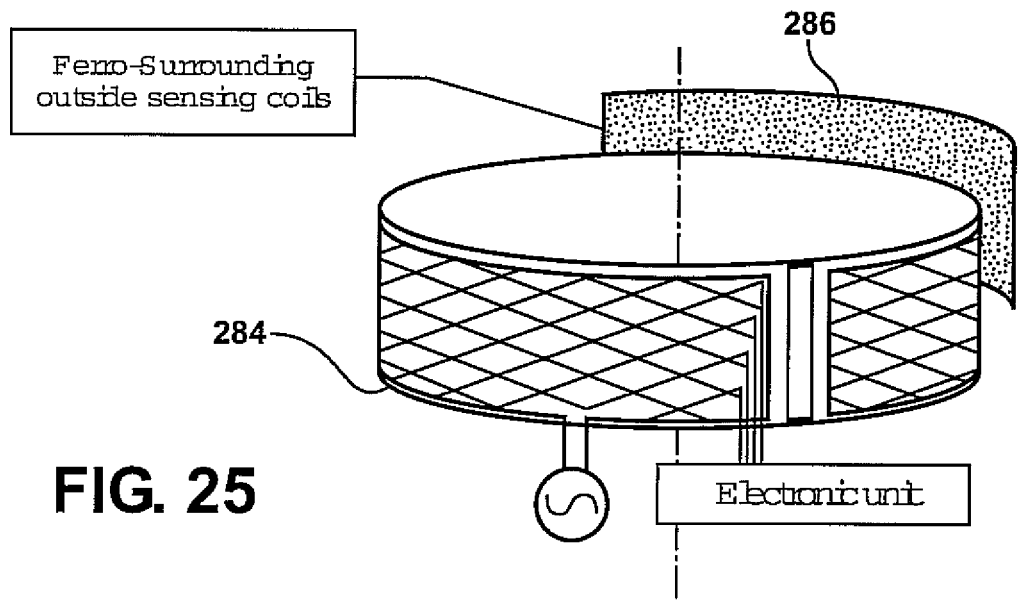
FIGS. 25-26 illustrate application of cylindrical geometry rotational sensors in ferromagnetic environments.

FIG. 25 shows ferromagnetic material 286 outside the coil assembly 284. Cylindrical geometry coil assemblies, particularly without a specialized DM coil, work well in such situations.

Figure 26:
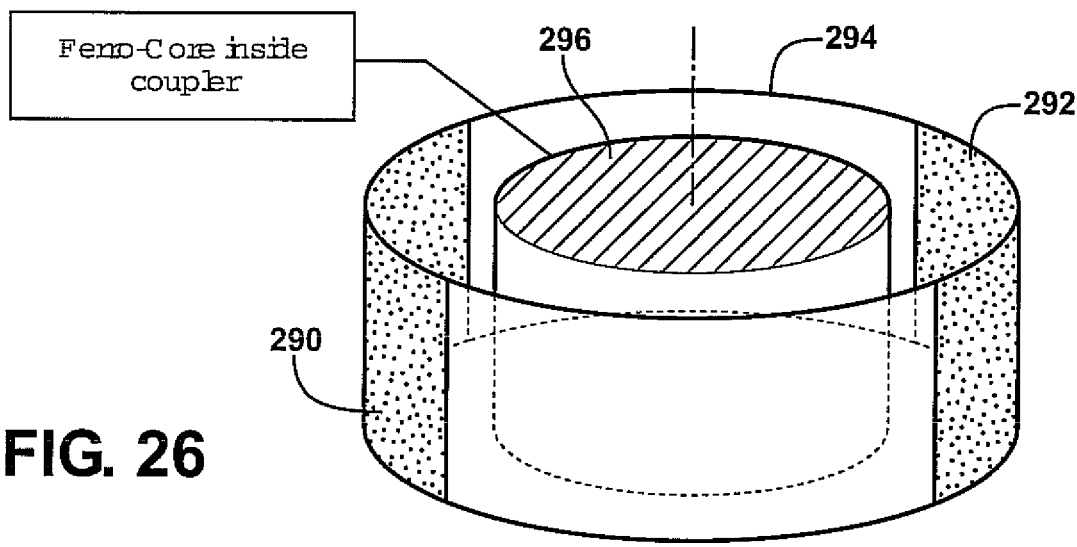

FIG. 26 shows a ferromagnetic core 296 extending through the center of a coupler 294 comprising two coupler elements 290 and 292. However the number of couplers (in cylindrical transformation) might be arbitrary according to the number of the forward/backward winding pairs. For example, the sensor as in FIG. 21 that shows one pair of forward/backward winding pair, only one coupler is good, while in the case of sensors as in FIG. 18 that shows two forward/backward winding pairs, two couplers are good, and so on.

This number of couplers of cylindrical transformation is quite different from linear counter part, in which only one coupler can be used (of course two couplers are used for two pairs of F/B windings). A coil assembly such as 284 (see FIG. 25) may be concentric with the coupler, and outside it. Again, cylindrical geometry coil assemblies, particularly without a specialized DM coil, work well in such situations.

FIG. 27 shows a partially exploded view of an assembly comprising rotating shaft 310, with threaded outside surface 308. The sensor coil assembly 302, on a PCB, is supported on a threaded sleeve 300, the inside threaded surface of which engages with the threaded surface 308. The coupler 306 rotates with the shaft 310. An electronic circuit 304 provides the positional signal. Sleeve 312 is used to attach the coupler 306 to the rotating shaft 310. The offset between the coupler 306 and the coil assembly changes as the shaft 310 rotates. The common mode signal can be used to measure the offset, and hence to determine the number of revolutions, with an LM being selected to provide a linear output against rotation angle. To determine the offset of the coupler with respect to the sensor coil assembly PCB, the DM signal, or common mode signal from the LM coils, can be detected, so that the angle beyond one modulus can be measured. The offset is generated by rotation of the threaded sleeves, when the rotating shaft is turning. The DM signal will be again ratio-metric over CR, and is at its maximum when the offset is minimum.

Hence, the offset of the coupler with respect to the sensor PCB varies with rotation, and a reference signal can be determined (from non-phase-sensitive rectification of the receiver coils or using a specialized reference coil, not shown here) so that the angle beyond one modulus might be measured. The offset is generated by the rotation of treaded surfaces, as the rotating shaft turns. The reference signal may be ratiometric with respect to the exciter signal, and becomes a maximum when the offset is minimum.

FIG. 28 shows coupler 320 on the inside surface of a sleeve 324 having an outside threaded surface, which rotates within the sensor coil assembly 322 formed on threaded sleeve (details not shown). This arrangement may be used in the configuration of FIG. 27.

Figure 29:
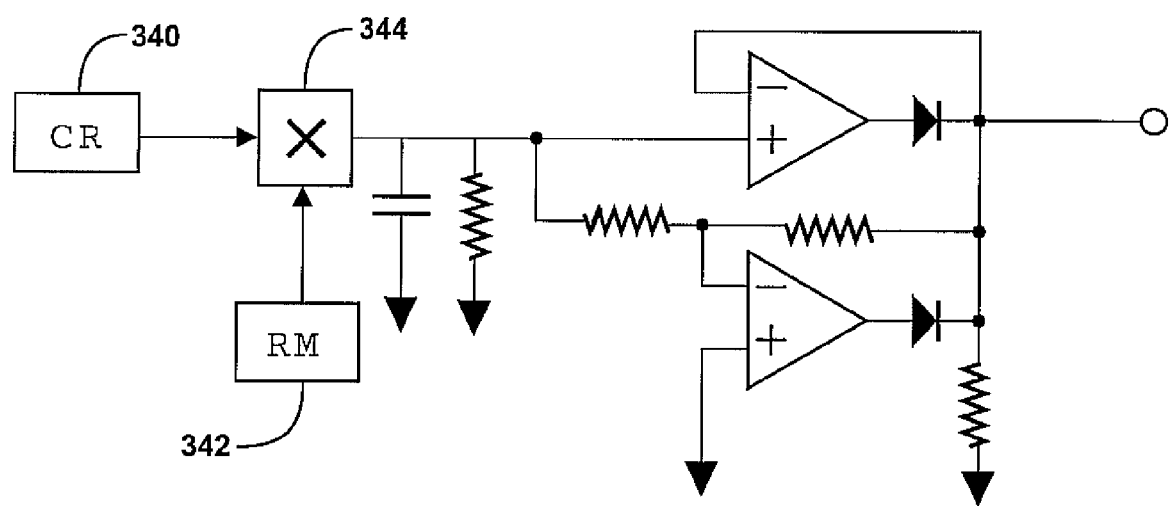
FIG. 29 illustrates a circuit for rectification to obtain a common mode signal.

FIG. 29 shows rectification of a signal for the gap or common mode signal. The circuit shows input of the exciter signal (CR) and the receiver coil signal (RM, shown, or LM). The signals enter an analog multiplier (344), and then is filtered and rectified. The output may be used as the common mode signal. Similar circuits may use signals from two or more receiver coils.

Phase insensitive rectification can be applied to eliminate the diode drop of common rectification. High frequency rectification can be done with a Gilbert-cell and low frequency rectification may use the circuit of FIG. 29. The super-diodes can be used to rectify a slow moving signal.

Patents, patent applications, or publications mentioned in this specification are incorporated herein by reference to the same extent as if each individual document was specifically and individually indicated to be incorporated by reference. In particular, U.S. Provisional Application U.S. Ser. No. 60/694,384, filed Jun. 27, 2005, is incorporated herein by reference. U.S. Provisional Application U.S. Ser. No. 60/618,448, filed Jun. 26, 2006 and U.S. patent application Ser. Nos. 11/399,150; 11/102,046; and 11/400,154, all to the same inventor, are incorporated herein by reference.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Having described my invention, I claim:

1. An apparatus for providing a signal related to a position of a part, the apparatus including:
    an exciter coil, the exciter coil generating magnetic flux when the exciter coil is energized by a source of electrical energy;
    a receiver coil, disposed proximate to the exciter coil, the receiver coil generating a receiver signal when the exciter coil is energized due to an inductive coupling between the receiver coil and the exciter coil,
    the receiver coil having a plurality of sections, the inductive coupling tending to induce opposed voltages in at least two of the sections,
    the inductive coupling being modified by movement of the part so that the receiver signal is related to the position of the part; and
    a reference coil, the reference coil providing a reference signal when the exciter coil is energized due to inductive coupling between the reference coil and the exciter coil,
    the reference signal being substantially independent of the position of the part.

2. The apparatus of claim 1, further comprising a coupler element mechanically coupled to the part,
    the coupler element modifying the inductive coupling between the exciter coil and the receiver coil so that the receiver signal is related to the part position.

3. The apparatus of claim 1, wherein the coupler element comprises a metal plate.

4. The apparatus of claim 3, wherein the coupler element comprises a generally U-shaped structure of an electrically conducting material, a coil assembly including the exciter coil and receiver coil being at least in part being located within an interior portion of the U-shaped structure.

5. The apparatus of claim 1, wherein the receiver coil is generally elongated, having a first end and a second end,
    a first section of the receiver coil having a major area proximate to first end,
    a second section of the receiver coil having a major area closer to the second end than the first section.

6. The apparatus of claim 5, wherein the apparatus is a linear position sensor, the apparatus providing a signal related to the position of the part along a linear path,
    the receiver coil being generally elongated along the linear path.

7. The apparatus of claim 1, wherein the receiver coil has a generally rectangular perimeter.

8. The apparatus of claim 7, wherein the receiver coil includes two generally triangular sections.

9. The apparatus of claim 1, wherein the apparatus is a rotational sensor,
    the receiver coil and exciter coil being disposed on a generally cylindrical substrate.

10. The apparatus of claim 9, further comprising a coupler element moving along, a generally circular path concentric to the generally cylindrical substrate.

11. The apparatus of claim 9, the apparatus being a rotational sensor for a shaft extending through the generally cylindrical surface.

12. The apparatus of claim 1, the part being a pedal.

13. The apparatus of claim 1, the apparatus being an electronic throttle control.

14. The apparatus of claim 1, the exciter coil, the receiver coil, and the reference coil being formed as a coil assembly on a printed circuit board.

15. The apparatus of claim 1, further including an electronic circuit receiving the reference signal and the receiver signal, the electronic circuit providing the signal correlated with the part position.

16. The apparatus of claim 15, wherein the signal correlated with the part position is a ratiometric signal formed using the receiver signal and the reference signal.

17. An apparatus for providing a signal related to a position of a part, the apparatus including:
    an exciter coil, the exciter coil generating magnetic flux when the exciter coil is energized by a source of electrical energy;
    a receiver coil, disposed proximate to the exciter coil, the receiver coil generating a receiver signal when the exciter coil is energized due to an inductive coupling between the receiver coil and the exciter coil,
    the receiver coil having a plurality of sections, the inductive coupling tending to induce opposed voltages in at least two of the sections;
    a coupler element mechanically coupled to the part, the coupler element modifying the inductive coupling between the exciter coil and the receiver coil so that the receiver signal is related to the part position;
    a reference coil, the reference coil providing a reference signal when the exciter coil is energized due to inductive coupling between the reference coil and the exciter coil,
    the reference signal being substantially independent of the position of the part; and
    an electronic circuit receiving the reference signal and the receiver signal, the electronic circuit providing the signal correlated with the position of the part.

18. The apparatus of claim 17, wherein the part is a pedal, the apparatus being a pedal position sensor.

19. The apparatus of claim 17, the apparatus being an electronic throttle control.

* * * * *

UNITED STATES PATENT AND TRADEMARK OFFICE
CERTIFICATE OF CORRECTION

Page 1 of 1

PATENT NO.       : 7,821,256 B2
APPLICATION NO.  : 12/241508
DATED            : October 26, 2010
INVENTOR(S)      : Joong K. Lee It is certified that error appears in the above-identified patent and that said Letters Patent is hereby corrected as shown below:

Column 5, line 23, replace "tale" with --take--

Signed and Sealed this
Thirteenth Day of September, 2011

David J. Kappos
*Director of the United States Patent and Trademark Office*